(12) United States Patent
McKee

(10) Patent No.: US 8,365,899 B2
(45) Date of Patent: Feb. 5, 2013

(54) HITCH GUARD SYSTEMS FOR CONVEYORS

(75) Inventor: James P. McKee, Ada, MI (US)

(73) Assignee: Flexible Steel Lacing Company, Downers Grove, IL (US)

(*) Notice: Subject to any disclaimer, the term of this patent is extended or adjusted under 35 U.S.C. 154(b) by 349 days.

(21) Appl. No.: 12/723,513

(22) Filed: Mar. 12, 2010

(65) Prior Publication Data

US 2010/0230247 A1   Sep. 16, 2010

Related U.S. Application Data

(60) Provisional application No. 61/160,195, filed on Mar. 13, 2009.

(51) Int. Cl.
*B65G 47/66* (2006.01)
(52) U.S. Cl. .................. 198/539; 198/599; 198/600
(58) Field of Classification Search .................. 198/539, 198/599, 600, 605
See application file for complete search history.

(56) References Cited

U.S. PATENT DOCUMENTS

| | | | |
|---|---|---|---|
| 2,237,345 A | 6/1939 | Frentzel et al. | |
| 2,536,961 A | 1/1951 | Smith | |
| 2,624,444 A * | 1/1953 | Casabona | 198/560 |
| 3,345,957 A | 10/1967 | Welch | |
| 3,548,996 A | 12/1970 | Ellis et al. | |
| 4,096,943 A | 6/1978 | Gentsch | |
| 4,989,723 A | 2/1991 | Bode et al. | |
| 5,009,307 A | 4/1991 | Chance et al. | |
| 5,215,182 A | 6/1993 | Garbagnati | |
| 5,597,063 A | 1/1997 | Bogle et al. | |
| 5,971,129 A * | 10/1999 | Stawniak et al. | 198/325 |
| 6,138,819 A | 10/2000 | Bogle et al. | |
| 6,164,435 A | 12/2000 | Coen et al. | |
| 6,550,604 B2 | 4/2003 | MacLachlan | |
| 7,210,569 B1 | 5/2007 | Tarhan et | |
| 7,258,225 B2 * | 8/2007 | Hall | 198/525 |
| 2005/0173858 A1 | 8/2005 | Temler et al. | |
| 2006/0108204 A1 | 5/2006 | Marsetti | |
| 2007/0023257 A1 | 2/2007 | Schiesser | |

OTHER PUBLICATIONS

Written Opinion of the International Searching Authority from the International Bureau of WIPO for International Application No. PCT/US2010/027196 dated May 10, 2010, 10 pages.

* cited by examiner

*Primary Examiner* — Douglas Hess
(74) *Attorney, Agent, or Firm* — Fitch Even Tabin & Flannery, LLP

(57) ABSTRACT

Hitch guards are provided for spanning a gap formed in a conveying surface between two adjacent rollers. In one aspect, the hitch guards include hitch guard members positioned side-by-side along the gap. An elongate mounting member extends across the conveyor belt and has the hitch guard members releasable mounted thereto. In another aspect, an elongate hitch guard member extends across the belt width in the gap and includes a laterally elongated recess to capture debris.

21 Claims, 24 Drawing Sheets

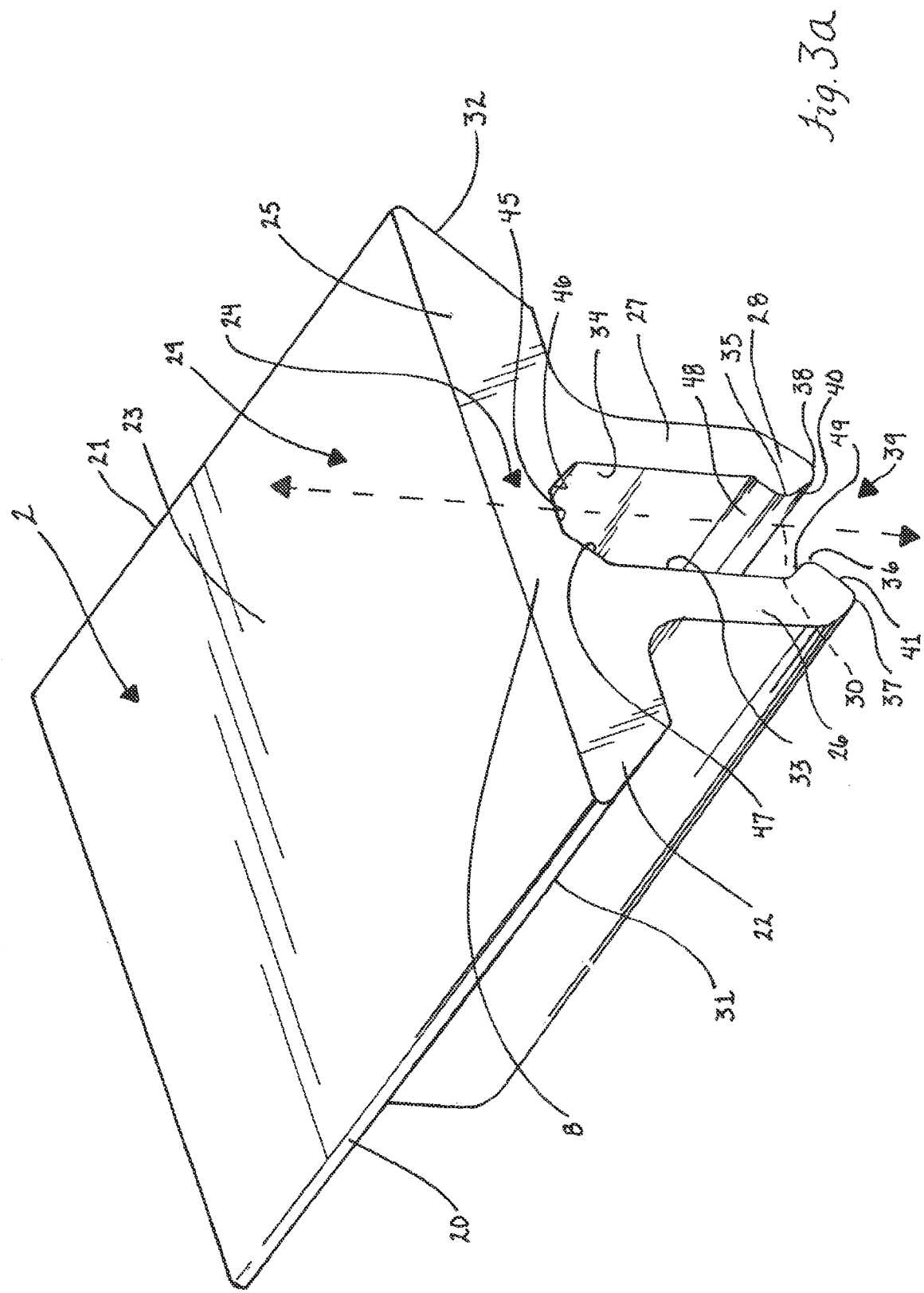

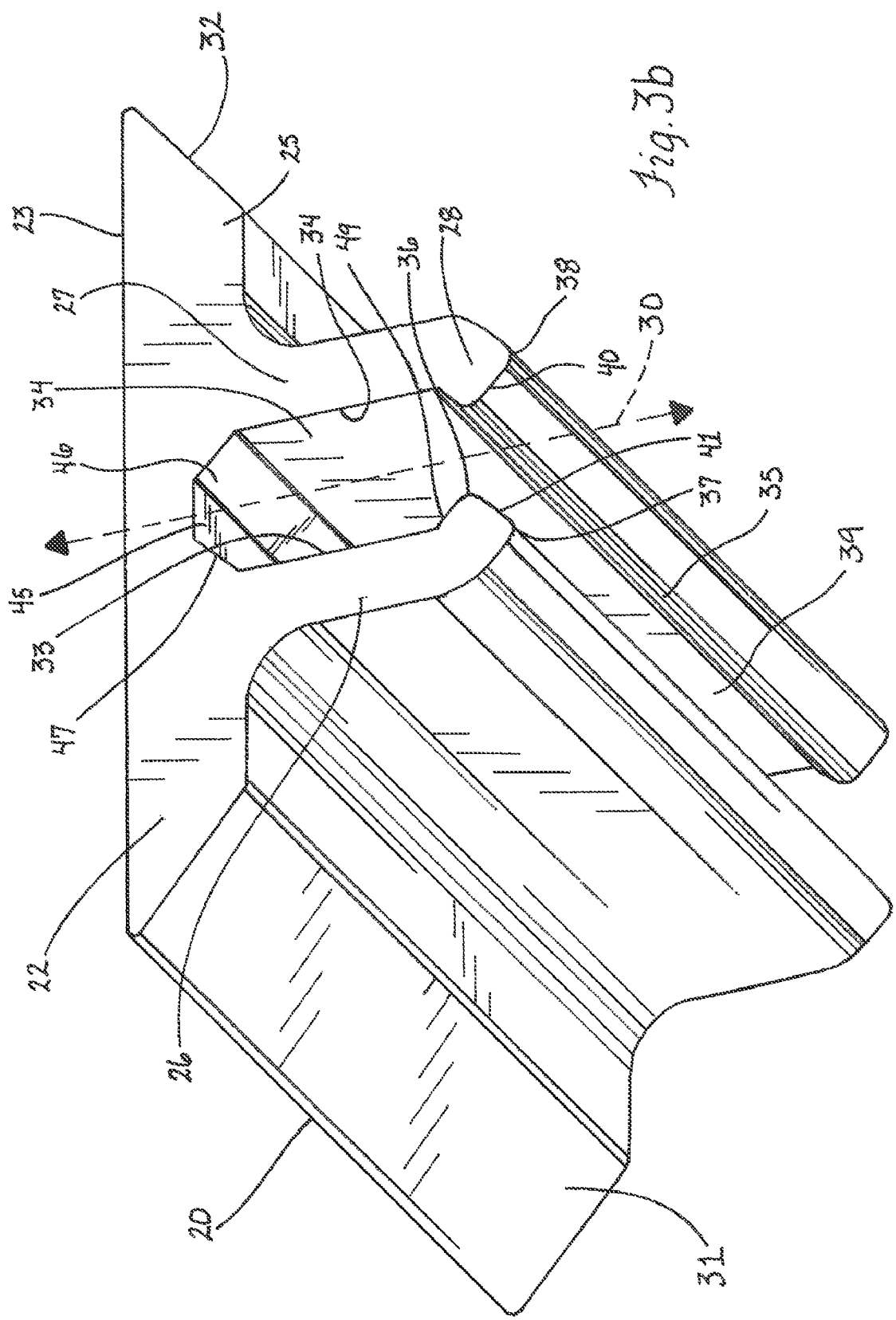

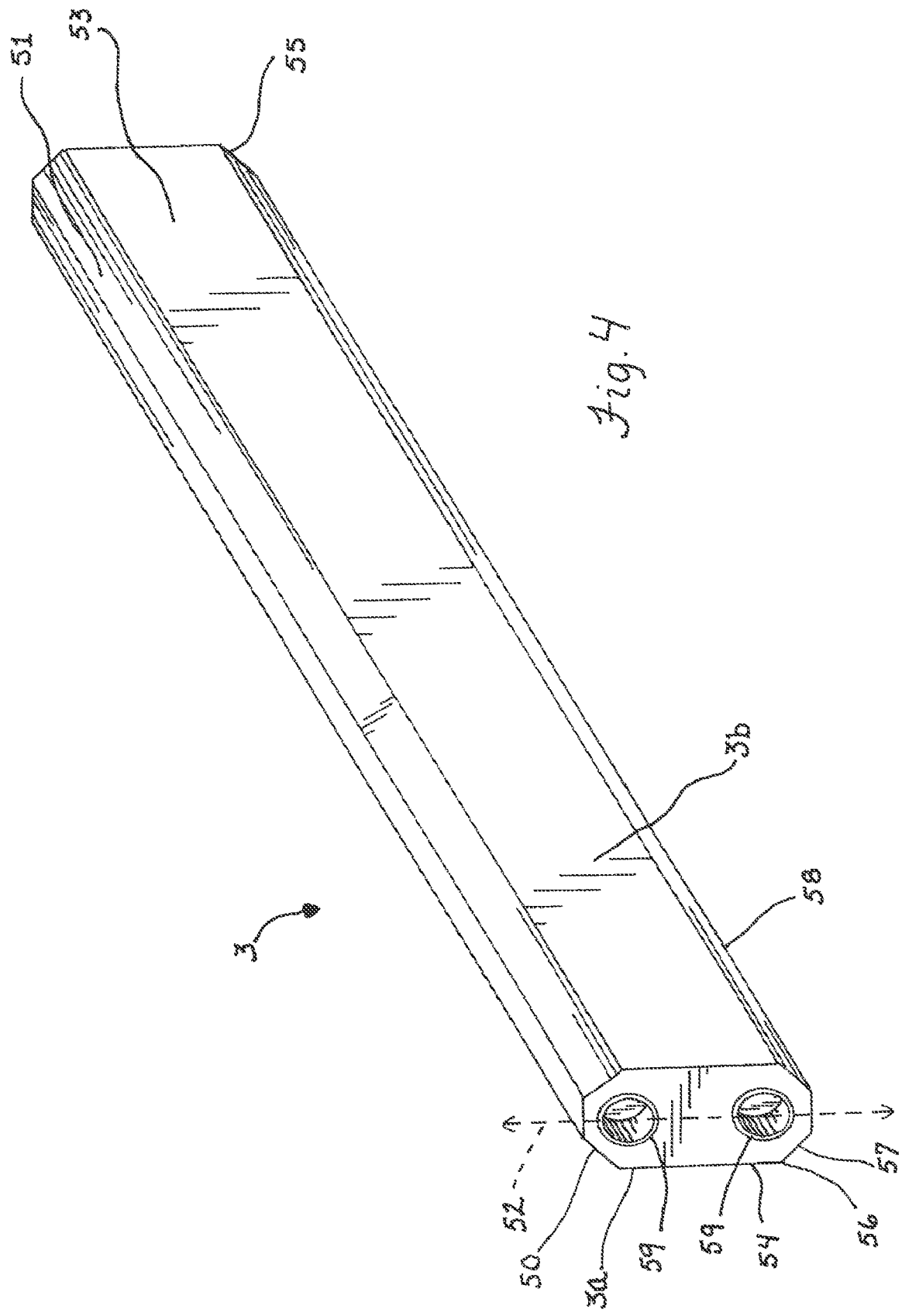

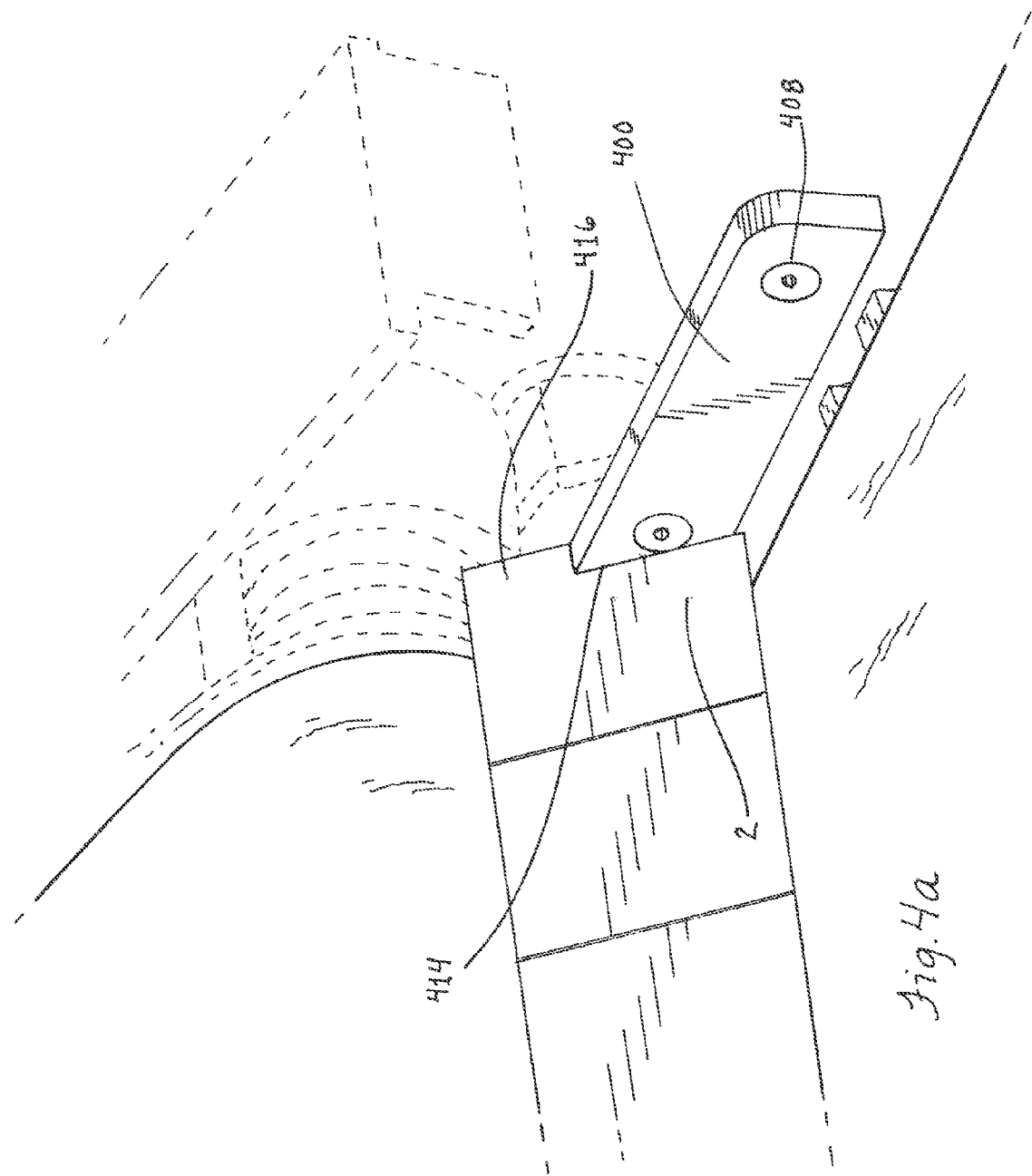

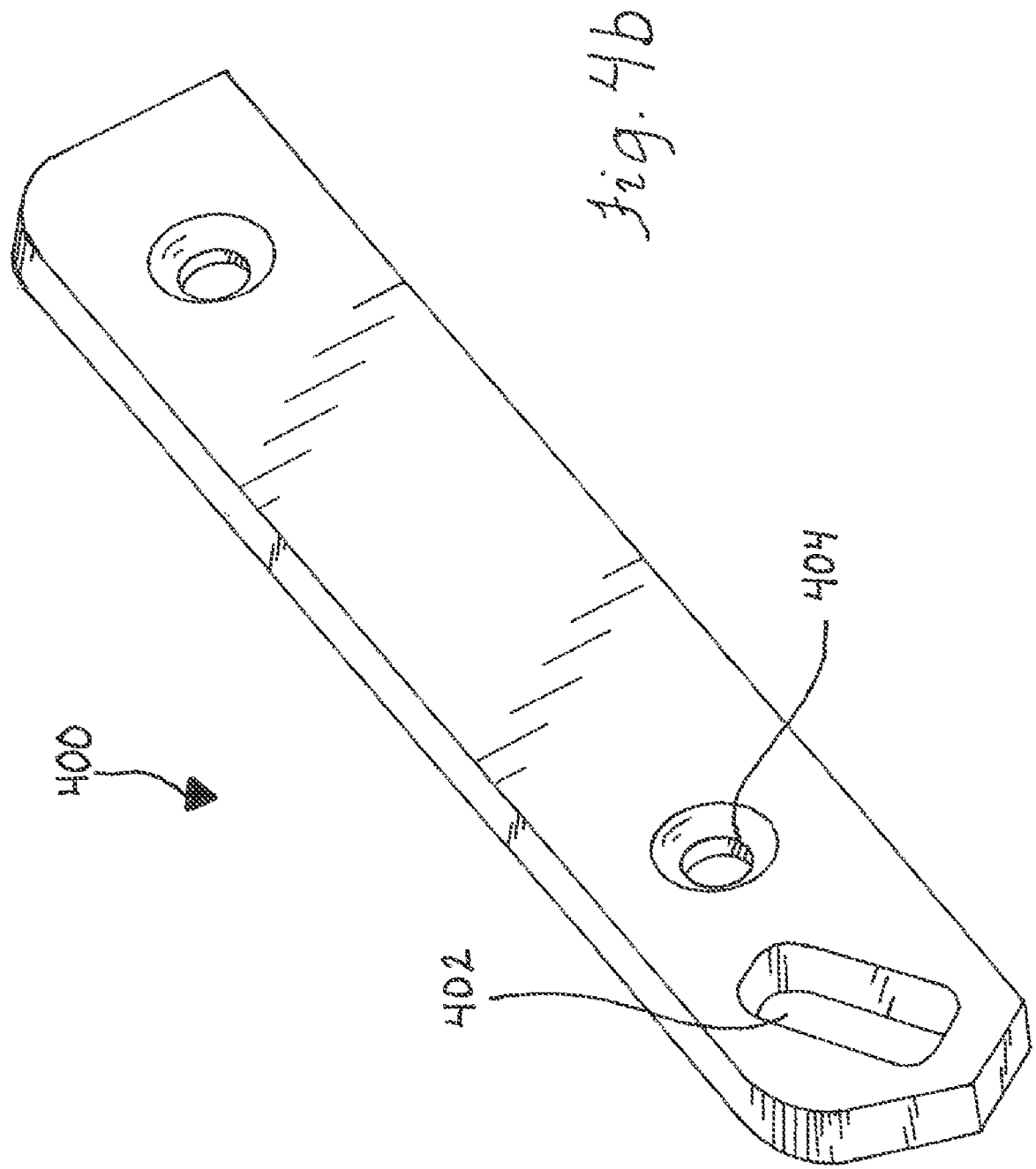

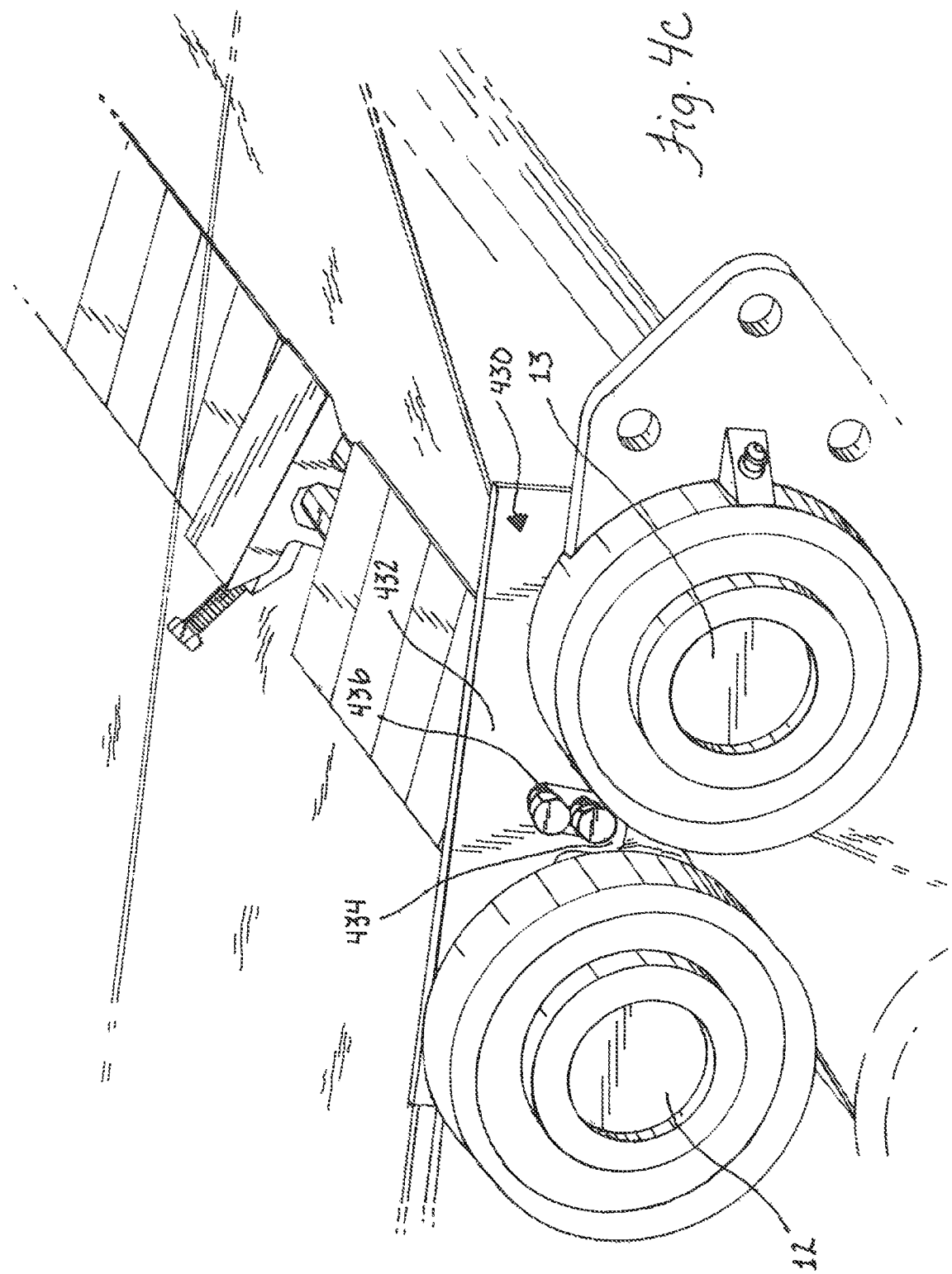

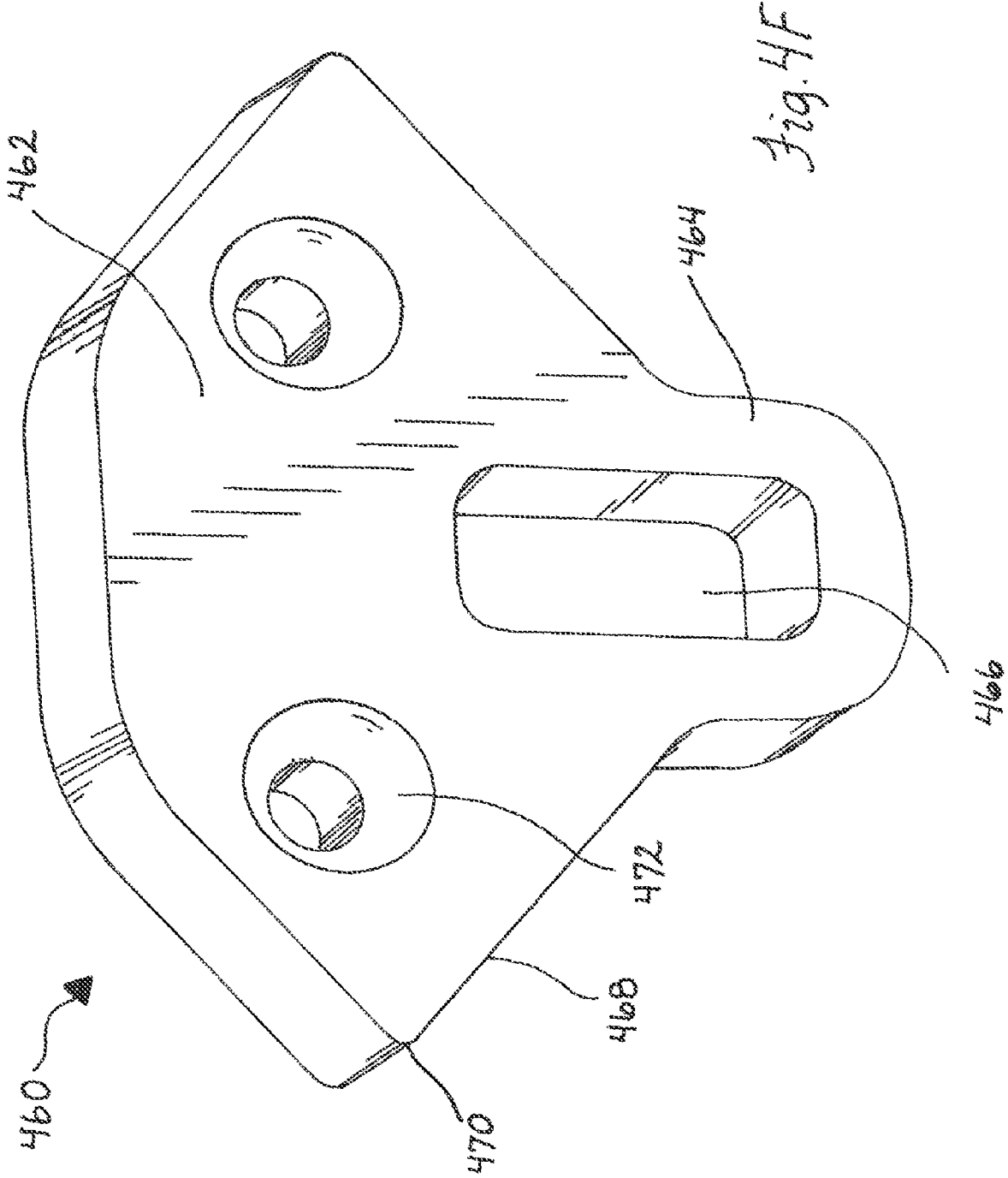

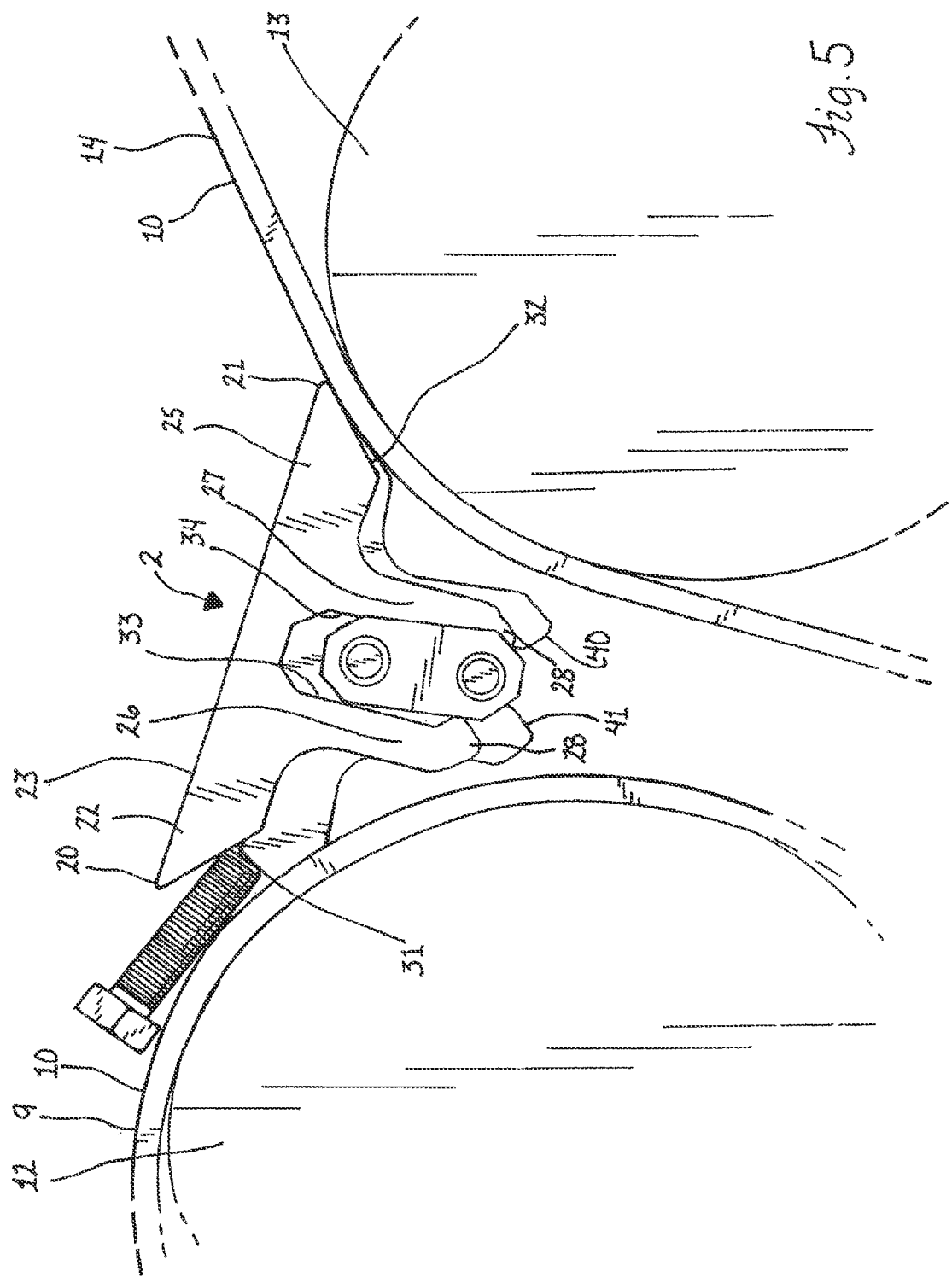

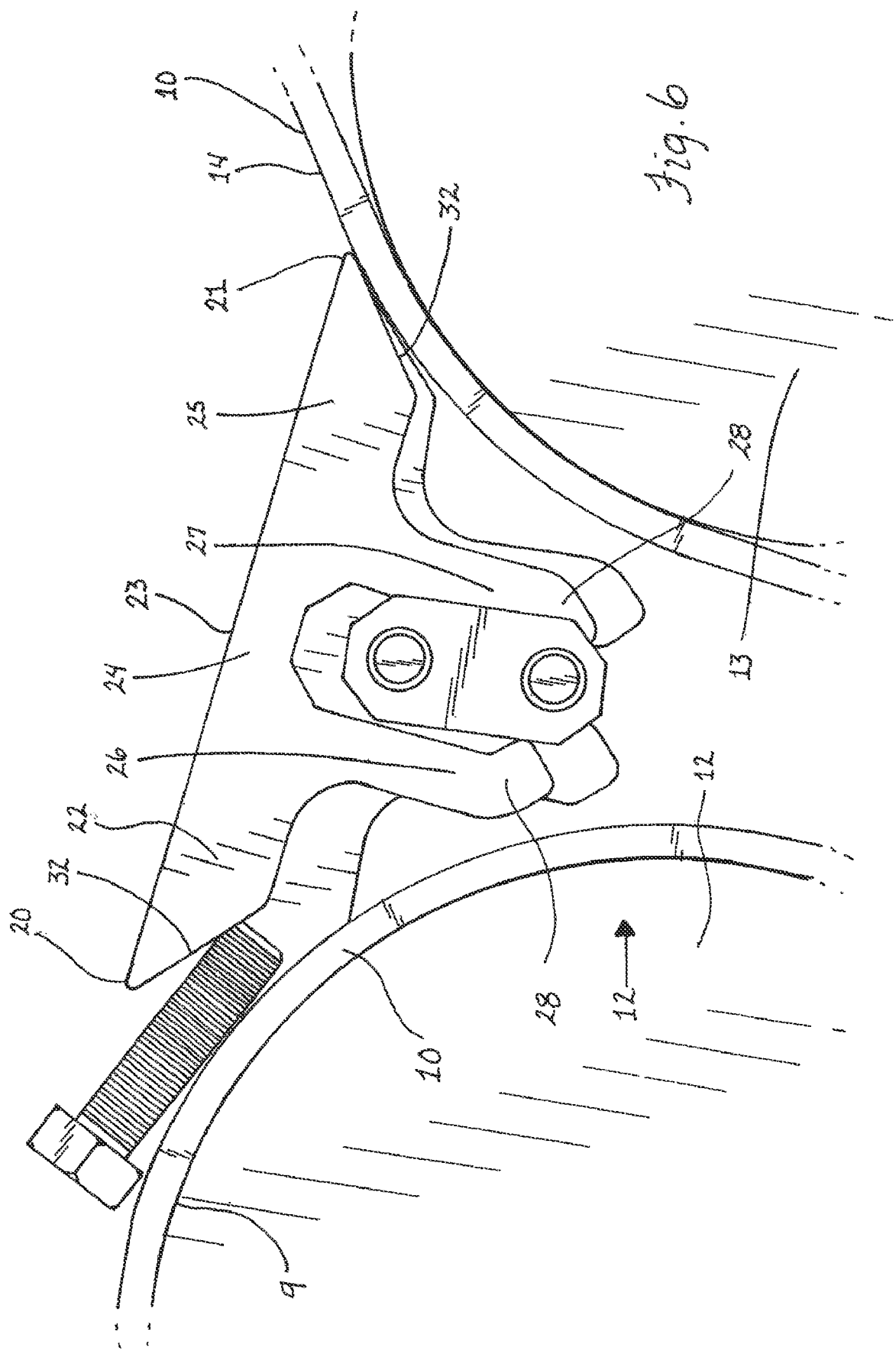

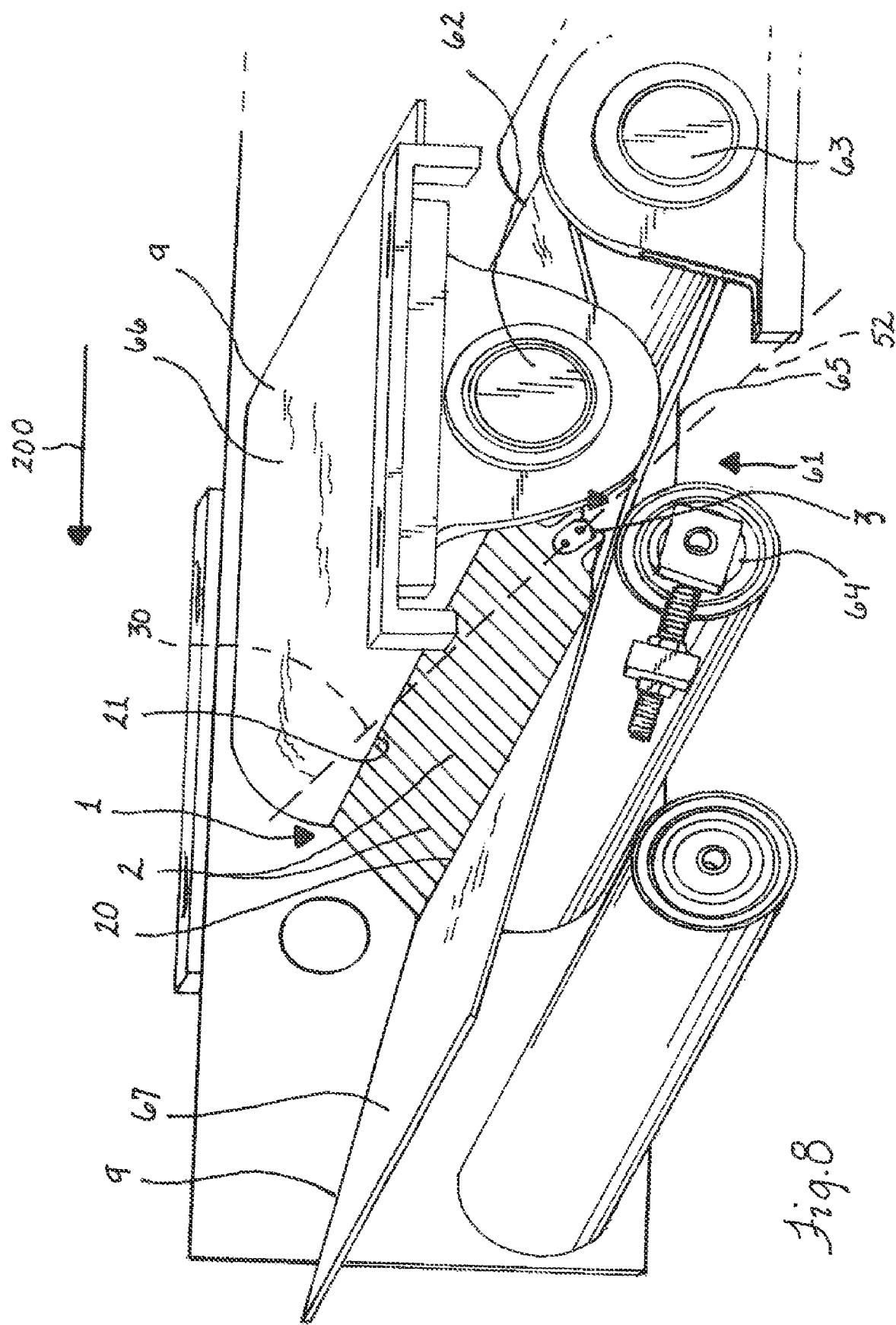

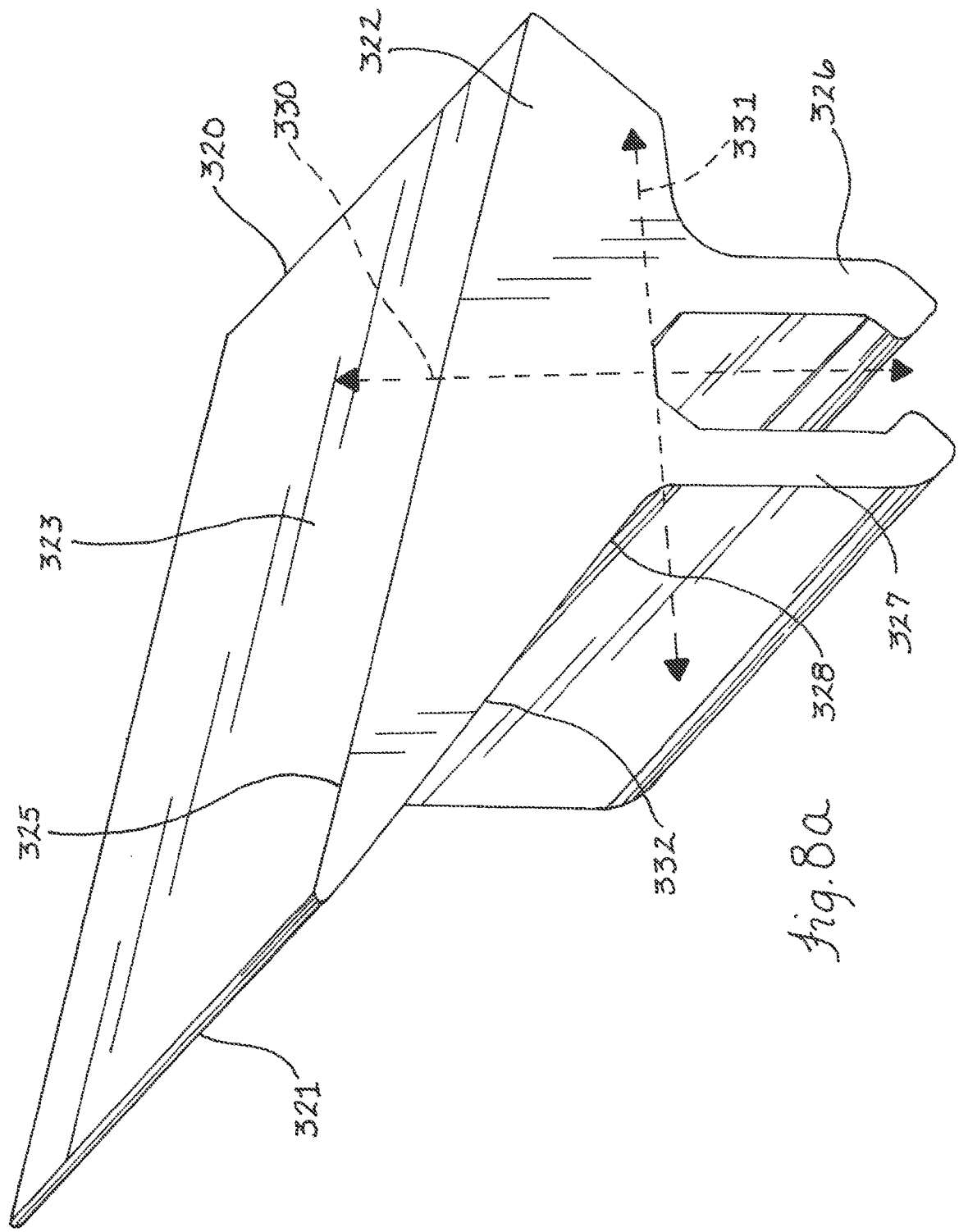

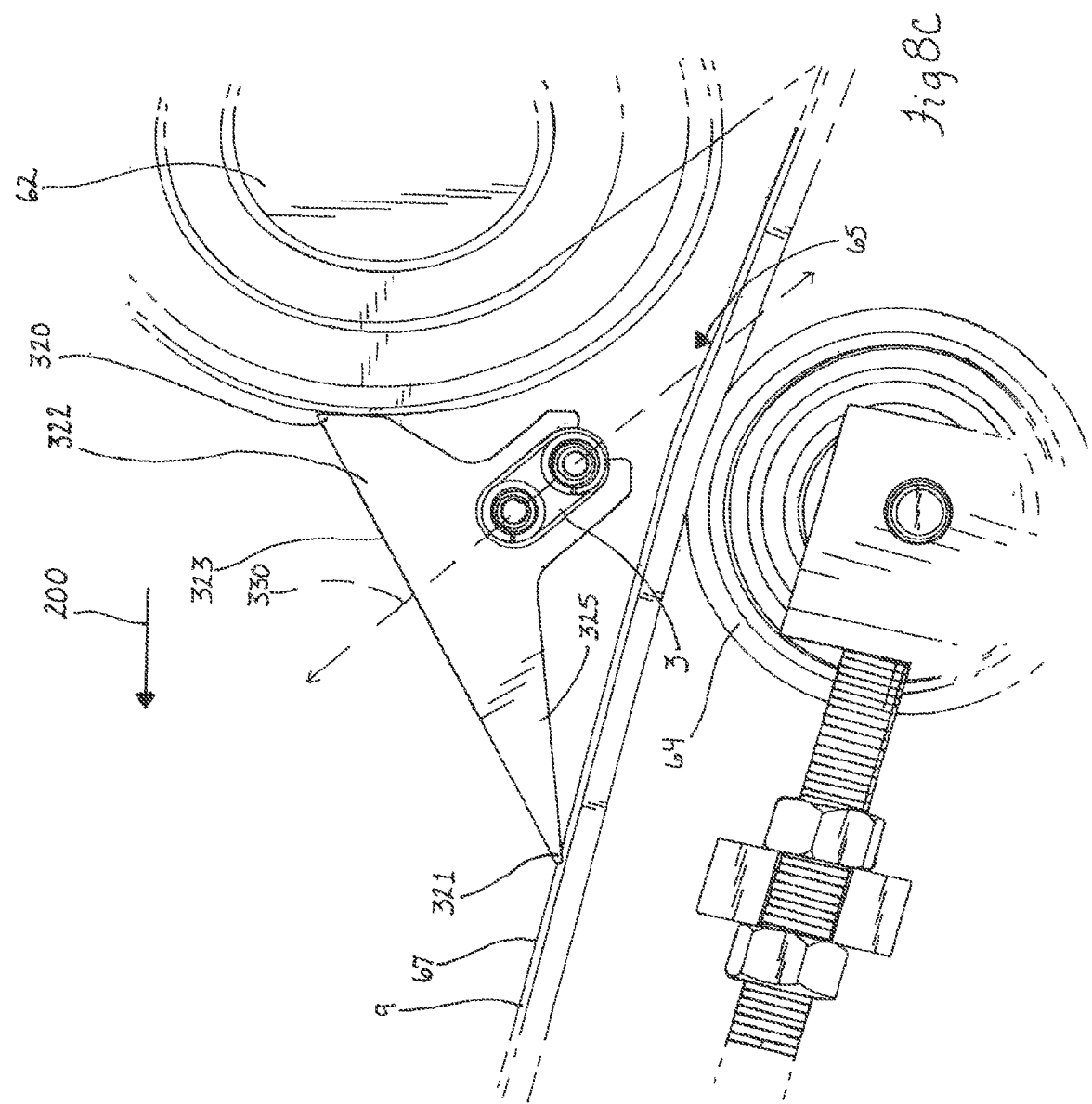

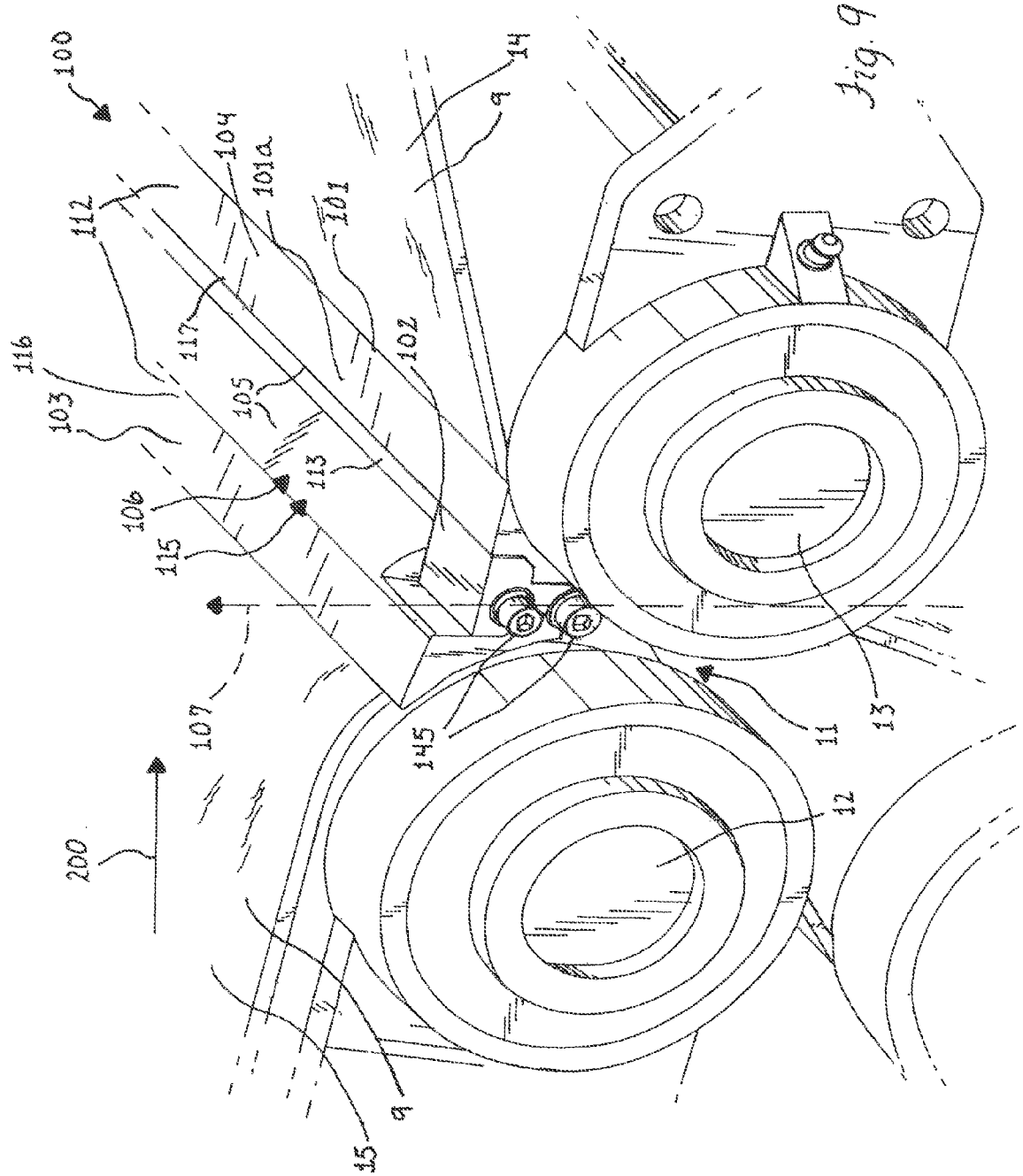

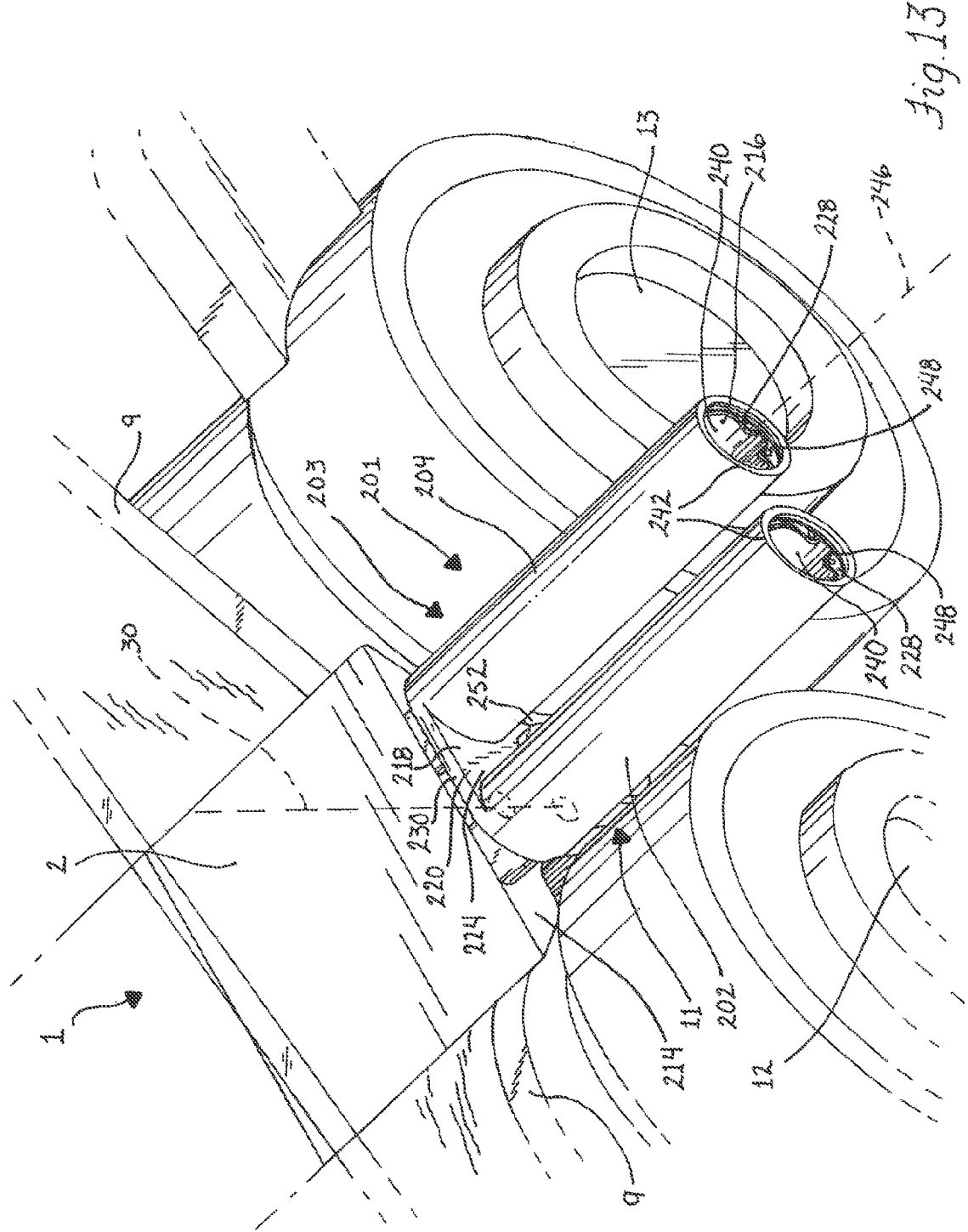

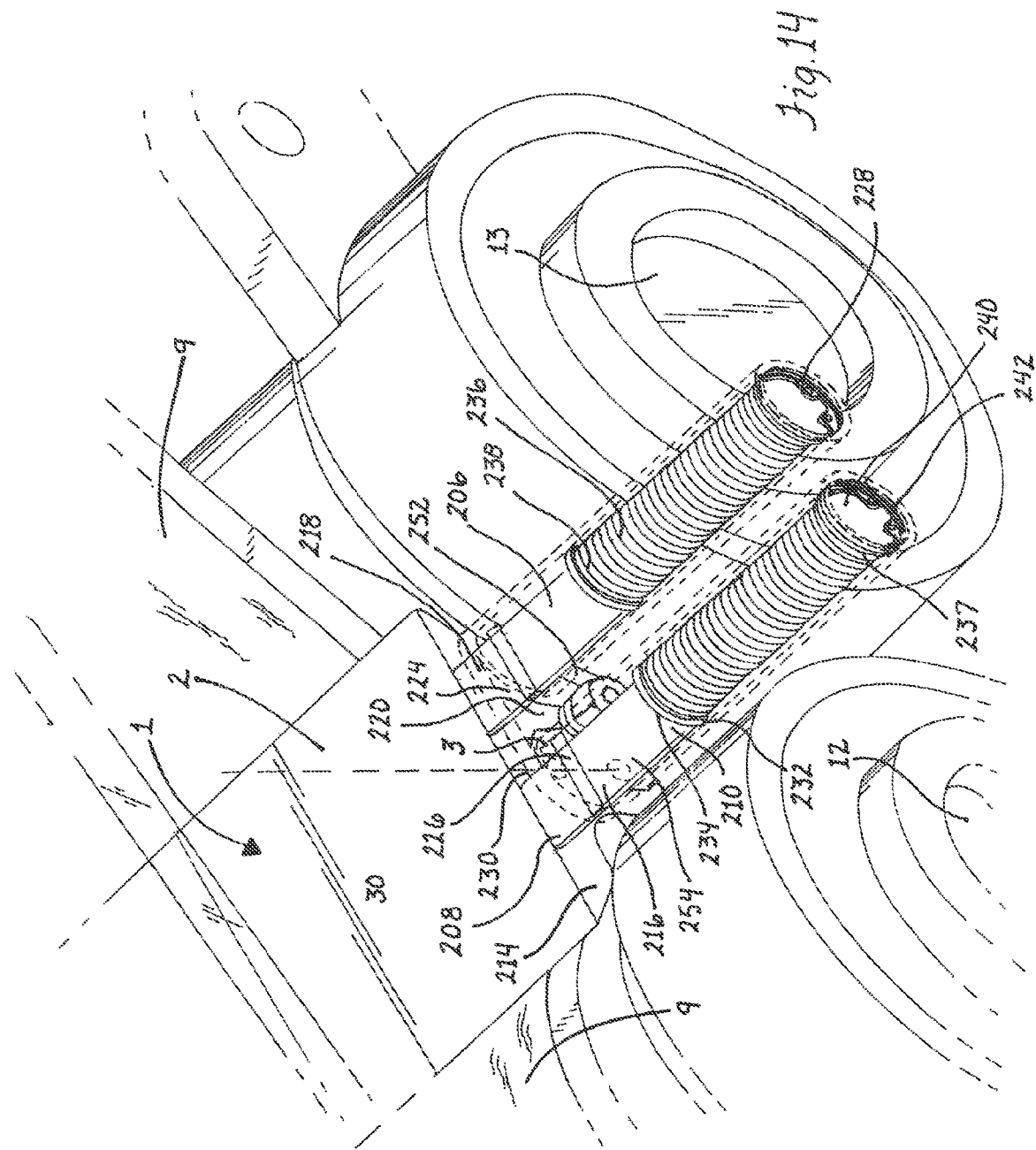

HITCH GUARD SYSTEMS FOR CONVEYORS

FIELD OF THE INVENTION

This invention relates to an apparatus for bridging a gap in a conveyor system or between conveyor systems.

BACKGROUND OF THE INVENTION

Conveyor belt systems are known that include a series of rollers in order to maintain a desired amount of tension in a conveyor belt in situations, for example, where the belt shifts from a generally horizontal path to an upwardly inclined path. To allow this change of direction in a conveying system with a continuous belt, a hitch is provided including hitch rollers where a pair of adjacent rollers are disposed on either side of a gap in the belt conveying surface. Another hitch roller is used in a 3-roller hitch arrangement for allowing the belt to change directions while keeping tension on the belt extending about the hitch rollers. The placement of this tensioning hitch roller can vary considerably so that in some hitch setups the tensioning roller can be generally aligned or only slightly offset upstream or downstream below the upstream one of the pair of hitch rollers on either side of the conveyor belt gap. In this hitch set up, the pair of hitch rollers on either side of the gap in the belt conveying surface are generally at the same vertical level so that the conveying surface transitions from an upstream, generally horizontal orientation to a downstream, upwardly inclined orientation on either side of the gap.

In another hitch setup, the pair of hitch rollers on either side of the gap are vertically offset with the downstream hitch roller being lower than the upstream hitch roller. In this setup, the conveying surface also transitions from an upstream, generally horizontal orientation to a downstream, inclined orientation. However, there is a vertical drop-off from the upstream horizontal section to the downstream inclined section of the belt conveying surface. In both hitch setups, smaller debris such as nuts or bolts, or thinner products such as envelopes traveling along the belt, may fall into the gap as it passes over the gap or by cascading down an inclined downstream section of the belt conveying surface adjacent the gap, becoming trapped near the tensioning hitch roller.

Hitch guards have been used to provide a smooth transition across the gap in the belt conveyor surface and to cover the gap to minimize the debris falling between the adjacent upper rollers into the gap. One known hitch guard was formed from a bar of UHMW (ultra high molecular weight) polyethylene material with a square cross section that is cut across the diagonal to form two bars with identical triangular cross sections. The triangular bar is positioned such that the apex of the two equal sides is placed down between the adjacent rollers with the hypotenuse surface facing upwardly to bridge the gap across the hitch. Because the length and width of a hitch will vary depending on the width of the conveyor belt and the conveyor system setup, the above described triangular bar hitch guard generally had to be custom fabricated on site to ensure proper dimensions.

Another problem resides in the tolerance provided between the above-described hitch guard and the adjacent moving belt surface, which can allow small debris to become lodged between the hitch guard and the belt surface causing damage to the belt as the moving belt surface continuously rubs against the trapped debris. To address this problem, break-away transfer devices are known. With the above-described device, lag bolts were utilized to releasably mount the triangular bar hitch guard to the support plate members or stringers of the conveyor frame structure of the conveyor system. The lag bolts would shear under sufficient force so the hitch guard bar would break away to avoid belt damage.

One drawback of the above-described break-away hitch guard and other transfer devices such as disclosed in U.S. Patent Application Publication No. 2007/0023257 to Schiesser, is the manner in which the devices are mounted to break away during conveyor operations. Transfer devices that have their break-away mountings at the side support plate members or stringers of the conveyor system require that the longitudinally directed forces on the transfer device be redirected and transmitted through the device laterally to the remote break-away mountings. As is apparent, this can be a problem where the impacts or jams with the transfer device occur at a more laterally central location making the device less likely to break-away before the belt is damaged.

Another drawback with these break-away hitch guards is that in the event that the hitch guard breaks away, the hitch guard completely loses functionality requiring replacement of the entire hitch guard. In one transfer device disclosed in U.S. Pat. No. 3,548,996 to Ellis, a complex series of narrow, relief plates are individually removably attached by magnets to corresponding individual slidable mounting blocks having shafts that allow longitudinal movement in the direction of belt travel. This is a very complicated and expensive system, and by allowing longitudinal movement, this system is configured so that debris would enter the gap in the belt conveying surface.

SUMMARY OF THE INVENTION

In accordance with one aspect of the present invention, a hitch guard system includes several hitch guard segments or members having upper transfer surfaces for being positioned side-by-side along a gap in a belt conveying surface. An elongate mounting member extends across the conveyor belt and has the hitch guard members releasably mounted thereto. The mounting member is positioned in the gap in the conveyor belt between two adjacent hitch rollers so that the mounting member is generally below the hitch guard members, and specifically the upper surfaces thereof. The hitch guard members and lower mounting member have lower detachable connections therebetween. In this manner, the hitch guard members can detach from the mounting member should debris get jammed between one of the hitch guard members and the conveyor belt with enough force to dislodge the hitch guard member from the mounting member by releasing the detachable connection therebetween. If debris is jammed in between the hitch guard member and belt, other conveyed items may impact against the stuck debris or a lifted upstream edge of the hitch guard member with enough force to release the detachable connection and dislodge the hitch guard member. In the event of a sufficiently high impact wedge force that tends to generate an upward lifting force on the hitch guard member, the location of the detachable connection proximate to and generally immediately below the location of the impact will better ensure that the detachable connection is released so that belt damage caused by jammed debris will not occur.

The upper surfaces of the hitch guard members are sized in a longitudinal belt travel direction to span the conveyor belt gap so that a receiving edge of the hitch guard upper surface is closely positioned to the conveyor belt traveling over the upstream one of adjacent hitch rollers and a discharge edge is closely positioned to the conveyor belt traveling over the downstream one of the adjacent belt rollers. To this end, the detachable connections provided between the hitch guard members and lower, mounting member are configured to fix the upper surfaces, including the upstream receiving and downstream discharge edges thereof, against longitudinal shifting in the belt travel direction prior to the detachment of the hitch guard members so that debris does not accumulate in the gap under the hitch guard members, during normal conveyor belt operations.

In a preferred form, each hitch guard member includes a pair of leg portions generally projecting downward from a hitch guard upper bridge portion on which the upper transfer surface is formed. The leg portions are spaced to tightly fit the elongate mounting member or bar therebetween, and preferably the leg portions are formed to be resiliently flexible for being snap fit onto the mounting bar. The legs each extend laterally and are spaced longitudinally from each other in the belt travel direction so that the upstream leg bears tightly against the mounting bar keeping the hitch guard members fixed against longitudinal shifting in the downstream direction as products are conveyed over the upper surfaces thereof. However, when debris gets lodged between the upstream, receiving edge of one of the hitch guard members and the belt, the resilient legs can resiliently deform to allow the hitch guard member to detach from the mounting bar before the belt is damaged by the stuck debris.

In accordance with another aspect of the present invention, a hitch guard system is provided having a hitch guard member that is laterally elongated so as to extend laterally across the belt and fit in the conveyor belt gap. The elongated hitch guard member has a laterally elongated recess formed therein. In this manner, debris is captured in the hitch guard recess rather than falling onto the conveyor belt gap and building up therein.

More particularly, in a preferred form, the hitch guard member includes an upstream receiving edge adjacent to the belt traveling on an upstream one of the adjacent hitch rollers and a downstream discharge edge adjacent to the belt traveling on a downstream one of the adjacent hitch rollers with the recess being an elongate channel located therebetween. The channel provides a trap to catch debris traveling downstream or cascading back down an inclined downstream section of the conveyor belt to keep the debris from falling into the conveyor belt gap, potentially damaging components of the conveyor system including the lower hitch roller in the belt gap. The trap also provides a convenient single location where operators can go to manually remove debris from the conveyor system.

Preferably, the hitch guard members are formed from a material presenting a surface with good abrasion resistance and a low coefficient of friction such as UHMW polyethylene, or the like. Since the mounting member should not normally contact debris or conveyed products, the mounting member is preferably formed of a metal or like material providing increased strength and durability.

While in the preferred embodiment the present invention is used in a gap in a conveyor belt as described above, the present hitch guard can also be utilized in other conveyor systems as well. For example, the present hitch guard can be used to bridge a gap formed between the rollers of two roller conveyor systems that do not use a belt or between one roller conveyer system and another conveyor belt system or between two adjacent conveyor belt systems.

In another aspect, a hitch guard system is provided that includes a plurality of hitch guard members such as described above and which includes an automated gap take-up mechanism. The automated gap take-up mechanism is operable to take-up the gap left when one of the hitch guard members is detached from its mounting member so that another one or more of the hitch guard members is automatically shifted laterally into at least a portion of the gap.

In a preferred form, the automated gap take-up mechanism includes a spring cartridge at one side of the belt adjacent the gap in which the hitch guard members are mounted. Alternatively, spring cartridges can be provided at both sides of the belt adjacent the belt gap. The spring cartridge includes a spring-biased actuator that urges the hitch guard member laterally inward toward the other side of the belt. With a spring cartridge at only one side of the belt, the travel of the biased actuator member is set to be slightly greater than the width of a hitch guard member in the lateral direction across the belt. In this manner, should a hitch guard member be dislodged, the actuator member will urge the hitch members between it and the dislodged hitch guard member to shift toward the other end of the belt. This shifting causes the hitch guard member adjacent the dislodged hitch guard member on the actuator side to be urged into abutment with the hitch guard member on the other side of the dislodged hitch guard member. If a spring cartridge is only provided on one side of the belt, a stop or abutment surface is provided on the opposite side of the belt to restrict the spring cartridge from urging the hitch guard members beyond the opposite side of the belt.

In this manner, no gaps in any of the adjacent hitch guard members remain even after one of the hitch guard members is detached from the mounting member. Also, since the actuator is preferably provided with travel greater than the lateral width of the hitch guard members, even after the hitch guard members have been shifted due to the dislodgement of one of the hitch guard members, there will be a bias force that is still exerted against the hitch guard members to keep them tightly engaged with one another so that no gaps develop therebetween.

It should be noted that if spring cartridges are used at both sides, then the travel of their respective actuators can be set to be slightly greater than half of the lateral width of a hitch guard member so that the combined travel of the actuators is still greater than the width of a hitch guard member. In this manner, the hitch guard members on either side of the dislodged hitch guard member will be shifted toward each other with the hitch guard member on one side of the dislodged hitch guard member shifted into abutment with the hitch guard member on the other side that is also shifted into abutment therewith so that portions of both of these hitch guard members will be occupying the space formerly occupied by the dislodged hitch guard member. Also, since the combined travel of the actuators is preferably set to be greater than the lateral width of a hitch guard member, even after shifting of the hitch guard members, a bias force will still be provided to the hitch guard members to keep them tightly engaged with one another.

It should be understood that upon shifting of the hitch guard members on one side of a dislodged hitch guard member to take-up the gap formed by the dislodged hitch guard member, the lateral outermost hitch guard member will be shifted inwardly, forming an open space along the hitch guard conveying surface at the lateral edge of the belt at the original position of the lateral outermost hitch guard member. Thus, in one embodiment, one or more additional replacement hitch guard members may be provided beyond the lateral edges of the belt so that upon shifting of the hitch guard members inwardly to replace a dislodged hitch guard member, a replacement hitch guard member will take-up the open space that would otherwise form at the lateral outermost edge of the belt upon inward shifting of the lateral outermost hitch guard member. In this approach, a longer mounting bar may be provided that extends beyond the lateral edge of the belt to provide a location for snap fit connections for the one or more replacement hitch guard members.

BRIEF DESCRIPTION OF THE DRAWINGS

FIGS. 3A and 3B are perspective views of a single hitch guard member showing an upper bridge portion and a pair of depending leg portions;

FIG. 4 is a perspective view of the mounting bar having an octagonal cross-sectional configuration for fitting in a similarly configured space between the leg portions of the hitch guard members;

FIG. 4A is a perspective view of a hitch guard system showing a mounting plate for supporting a mounting member in an alternate conveyor belt hitch setup;

FIG. 4B is a perspective view of the mounting plate of FIG. 4A, showing an opening for receiving a mounting member;

FIG. 4C is a perspective view of a hitch guard system showing an elongate mounting plate for supporting a mounting member in a conveyor belt hitch setup;

FIG. 4F is a perspective view of the hexagonal mounting plate of FIG. 4E showing an opening for receiving a mounting member;

FIG. 5 is a side elevation view of the hitch guard system showing debris lodged between the conveyor belt and an upstream edge of one of the hitch guard members with the leg portions thereof resiliently deflecting for releasing the hitch guard member from the mounting bar;

FIG. 6 is a side elevation view similar to FIG. 5 showing the forces acting on a hitch guard member as it is dislodged from the mounting bar;

FIG. 8 is a perspective view of the hitch guard system showing the hitch guard members positioned in a gap of an alternate conveyor belt hitch setup;

FIG. 8A is a perspective view of an alternate configuration for a hitch guard member tailored for use with the conveyor belt hitch setup of FIG. 8;

FIG. 8C is a side elevation view of the hitch guard member of FIGS. 8A and 8B installed in the conveyor belt hitch setup of FIG. 8;

FIG. 9 is a perspective view of a hitch guard system in accordance with another embodiment of the present invention showing a laterally elongate hitch guard member positioned in a conveyor belt gap and including a laterally elongated recess therein;

FIG. 13 is a perspective view of the hitch guard system of FIG. 1 including an automatic gap take-up mechanism in the form of a spring cartridge; and FIG. 14 is a perspective view of the hitch guard system of FIG. 13 showing housings in phantom with spring-loaded actuator plunger members therein.

DETAILED DESCRIPTION OF THE PREFERRED EMBODIMENTS

Figure 1:
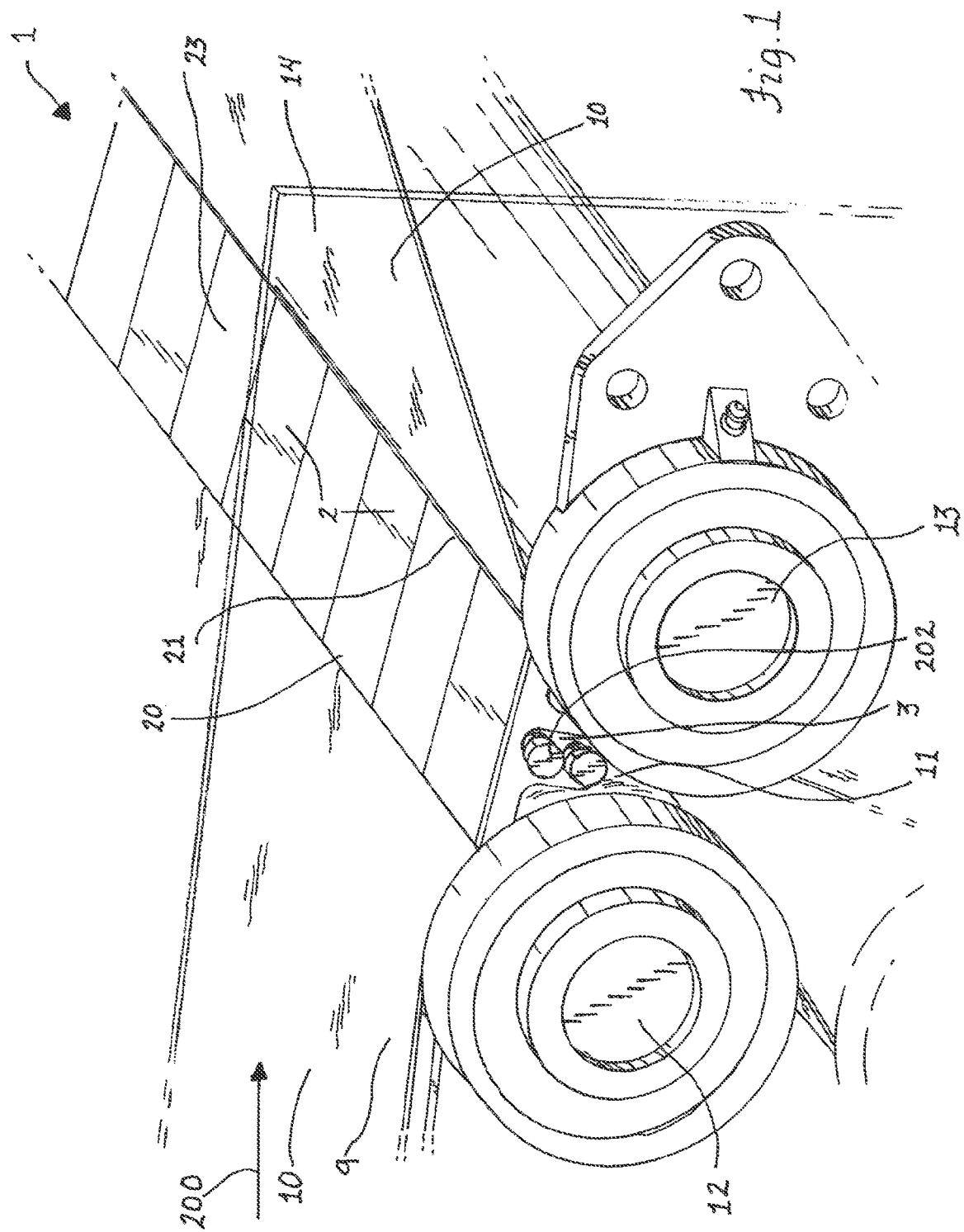
FIG. 1 is a perspective view of a hitch guard system in accordance with the present invention showing a plurality of hitch guard members positioned side-by-side to cover a gap in a conveyor belt.
Figure 2:
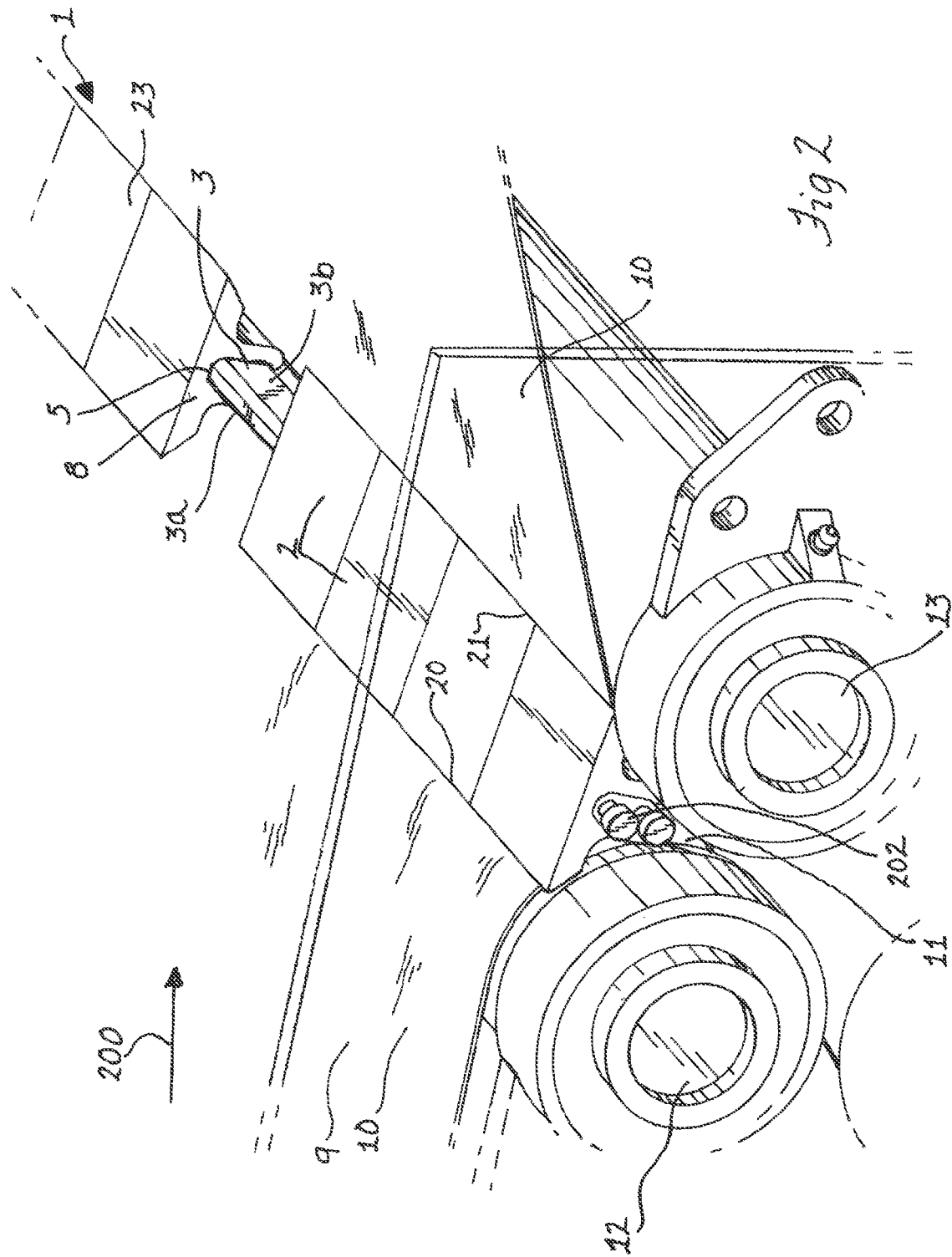
FIG. 2 is a perspective view of the hitch guard system of FIG. 1 showing one of the hitch guard segments removed after it has been dislodged from a lower mounting bar extending in the conveyor belt gap.

In FIGS. 1 and 2, a hitch guard system 1 in accordance with the present invention is illustrated. The hitch guard system 1 includes several hitch guard members 2 (FIGS. 3A and 3B) that extend across a conveyor belt 9 in a long, laterally extended gap 11 of a belt conveying surface 10 thereof, as shown in FIGS. 1 and 2. The hitch guard members 2 are fixed to an elongate mounting member in the form of mounting bar 3 that is disposed in the gap 11 with the hitch guard members 2 and mounting bar 3 having detachable connections 5 therebetween. Generally, this detachable connection 5 is directly below the corresponding hitch guard member 2 and, more specifically, directly below the upper, transfer surface 23 of each of the hitch guard members 2. In this manner, should debris get stuck under one of the hitch guard members 2 and against the moving belt 9 and either hit the hitch guard member 2 or later be impacted by a conveyed item to generate a sufficient upward force, the hitch guard member 2 can detach from the mounting bar 3 via the detachable connection 5 therebetween immediately below the upper, transfer surface 23 of the hitch guard member 2.

In this manner, each hitch guard member 2 will consistently be released from the mounting bar 3 if sufficient upward force is applied thereto no matter where the hitch guard member 2 is laterally positioned along the long gap 11 that extends laterally across the entire width of the belt 9. By configuring the detachable connection 5 to securely hold the hitch guard members 2 in place during normal conveyor belt operations (FIG. 1) and arranging the detachable connection 5 directly below the corresponding hitch guard members 2 to detach from the mounting bar 3 should a significantly high wedge impact force be applied thereto via debris stuck between the hitch guard members 2 and the conveyor belt 9 (FIG. 2), the hitch guard members 2 allow the items that are intended to be conveyed to pass smoothly over the gap 11 in the belt 9 and also the hitch guard members 2 are readily dislodged when loose debris or the like gets stuck so as to avoid belt damage caused by stuck debris forcefully rubbing against the moving belt 9.

As shown in FIGS. 1 and 2, the hitch guard members 2 have their upper surfaces 23 sized so as to longitudinally span the gap 11 in the belt conveying surface 10 formed between a pair of adjacent hitch rollers 12 and 13. In addition, the hitch guard members 2 can be positioned on the mounting bar 3 so that there are no lateral gaps between adjacent hitch guard members 2, with adjacent side edges 8 thereof abutting one another.

The preferred hitch guard member 2 has a body 29 with a π shaped configuration, as shown in FIGS. 3A and 3B. The hitch guard body 29 is preferably of a resilient material such as UHMW (Ultra High Molecular Weight) polyethylene. The body 29 includes an upper bridge portion 24 and a pair of depending leg portions 26 and 27 that can resiliently flex to form the detachable connection 5 with the mounting bar 3. The upper bridge portion 24 extends beyond each of the leg portions 26 and 27 so that the upper bridge portion 24 includes outboard portions 22 and 25 extending beyond the leg portions 26 and 27.

When the hitch guard members 2 are releasably secured to the mounting bar 3, one of the outboard portions is the upstream outboard portion 22 and the other outboard portion is the downstream outboard portion 25. The transfer surfaces are the flat upper surfaces 23 of the upper bridge portions 24 of the hitch guard member bodies 29. To this end, the outboard portions 22 and 25 extend into close proximity with the adjacent belt conveying surface 10 so there is an upstream receiving edge 20 of the upstream outboard portion 22 closely adjacent the moving belt 9 traveling about the upstream hitch roller 12 and a downstream discharge edge 21 of the downstream outboard portion 25 closely adjacent the moving belt 9 traveling about the downstream hitch roller 13. In one preferred form, the hitch guard members 2 and mounting bar 3 are symmetrical about their respective central, vertical axes 30 and 52, so as to allow the hitch guard members 2 to be connected with either outboard portion 22 or 25 projecting upstream or downstream with the vertical axes 30 and 52 of the hitch guard members 2 and mounting bar 3 being coincident when the hitch guard member 2 is attached to the mounting bar 3 in either orientation thereof.

As best seen in FIGS. 3A and 3B, the upstream outboard portion 22 has a lower inclined surface 31 that tapers downstream away and down from the thin upstream edge 20 so as to generally follow the belt 9 as it travels down about the upstream hitch roller 12. Debris that gets stuck will get caught between the belt 9 extending about the upstream hitch roller 12 and the lower inclined surface 31 of the hitch guard member body 29, as shown in FIG. 5. A similar lower inclined surface 32 is provided on the downstream outboard portion 25, and debris can get caught between it and the conveyor belt 9 as it may fall back along the downstream, upwardly inclined surface section 14 of belt conveying surface 10. Alternatively, these lower surfaces 31 and 32 could have other constructions, such as an arcuate configuration so as to even more closely follow the path of the belt 9 about the hitch rollers 12 and 13. So configured, the outboard portions 22 and 25 have a generally wedge-shaped configuration.

Preferably, the detachable connections 5 provided between the hitch guard members 2 and the mounting bar 3 are snap fit connections 5 with the hitch guard member leg portions 26 and 27 snapping onto the bar 3 to securely hold the hitch guard members 2 in place in conveyor belt gap 11 against longitudinal movement downstream in the belt travel direction 200 or upstream oppositely thereto. In this manner, debris that does not get stuck between the hitch guard member 2 and belt 9 will not fall into the gap 11 causing potential damage to other conveyor parts therein such as the hitch tensioning roller 72 (FIG. 7) or buildup therein so as to potentially dislodge overlying hitch guard members 2 and create impediments for potential damage to conveyed products.

The leg portions 26 and 27 extend laterally and have inner surfaces 33 and 34, respectively, which face each other. The leg portions 26 and 27 include lower end interference or cam portions 28 having oppositely tapering cam surfaces 40 and 41 that extend obliquely to the vertical axis 30 from their upper ends 35 and 36 down away from each other to their lower ends 37 and 38 that are further spaced apart than the closer upper ends 35 and 36, as can be seen in FIGS. 3A and 3B. The upper ends 35 and 36 of the interference portions 28 form an opening 39 that leads into a bar receiving space 44 between the leg portions 26 and 27. Referring to FIG. 4, the bar 3 has a maximum width between laterally extending parallel side surfaces 53 and 54 thereof that is wider than the spacing across the opening 39 between the upper ends 35 and 36 of the leg cam surfaces 40 and 41.

In the illustrated and preferred form as shown in FIG. 4, the mounting bar 3 has an octagonal configuration including a pair of tapering, upper guide surface portions 50 and 51 extending obliquely to the bar vertical axis 52. To snap fit the hitch guard members 2 onto the mounting bar 3, the opening 39 of the hitch guard member 2 is generally aligned over the bar 3, and the hitch guard member 2 is pushed down over the mounting bar 3 so that the cam surface portions 40 and 41 engage the upper guide surface portions 50 and 51. Continued downward pushing of the hitch guard member 2 causes the cam surfaces 40 and 41 to ride down the tapering guide surface portions 50 and 51 flexing the leg portions 26 and 27 outwardly, away from each other until the upper ends 35 and 36 of the cam surfaces 40 and 41 reach the corner junctures between the upper guide surfaces 50 and 51 and the side surfaces 53 and 54 of the mounting bar 3. The leg portions 26 and 27 remain resiliently flexed to be outwardly splayed until the upper ends 35 and 36 of the cam surfaces 40 and 41 clear lower ends 55 and 56 of the bar side surfaces 53 and 54 allowing the leg portions 26 and 27 to resiliently snap back toward each other to tightly grip the mounting bar 3 with the inner surfaces 33 and 34 of the leg portions 26 and 27 tightly bearing against corresponding surfaces of the mounting bar 3, as shown in FIGS. 1 and 2.

In this regard, the inner surface 33 of the upstream leg portion 26 bears tightly against the upstream side 3a of the mounting bar 3 to keep the hitch guard members 2 from shifting longitudinally in the belt travel direction 200 as the conveyed items travel across the transfer surface 23 thereof. Similarly, the downstream leg portion 27 bears tightly against the downstream side 3b of the mounting bar 3 to keep the hitch guard members 2 from shifting longitudinally opposite to the belt travel direction 200 such as if conveyed items fall back down from the upwardly inclined belt section 14 back upstream toward the hitch guard members 2.

As previously mentioned, the preferred mounting bar 3 has an octagonal configuration which includes a pair of tapering, lower guide surface portions 57 and 58 that extend obliquely to the bar axis 52 and taper down toward each other from their corner junctures with the mounting bar side surface portions 53 and 54 at the lower ends 55 and 56 thereof. The facing inner surfaces 33 and 34 of the leg portions 26 and 27 along with a central, lower surface 45 of bridge portion 24 also generally define an octagonal configuration for the space 44 with an open bottom thereof at opening 39 so that the mounting bar 3 generally has a mating fit in the space 44. Accordingly, the inner surfaces 33 and 34 include upper inclined surface portions 46 and 47 that extend obliquely to the vertical axis 30 from either end of the central surface portion 45 and taper down away from each other to side surface portions 33 and 34 that extend downwardly and parallel to each other and the vertical axis 30. At the bottom ends of the side surface portions 33 and 34, lower inclined surface portions 48 and 49 taper down and toward each other obliquely to the vertical axis 30. Lower ends of the lower inclined surface portions 48 and 49 form corner junctures with the upper ends of the cam surface portions 40 and 41.

With the hitch guard member 2 snap fit onto the mounting bar 3, the lower inclined surface portions 48 and 49 of the inner surfaces 33 and 34 of the leg portions 26 and 27 grip tightly against the lower guide surface portions 57 and 58 of the mounting bar 3. However, when a small item gets loose from a conveyed product such as the illustrated bolt in FIG. 5, as it travels downstream on the belt conveying surface 10 and approaches the gap 11 therein covered by the hitch guard members 2 of the present hitch guard system 1, it can get caught and lodged in the clearance space between the upstream edge 20 of the hitch guard member 2 and the belt 9 as it travels about the upstream hitch roller 12. Generally, the caught debris will exert a force on the hitch guard member 2 that is in a direction generally normal to the lower inclined surface 31 of the upstream outboard portion 22 of the hitch guard member 2, as shown in FIG. 6. As the hitch guard member 2 is resiliently deformed so that the lower inclined surface 32 of the downstream outboard portion 25 of the hitch guard member 2 engages the belt 9, forces both normal to the lower inclined surface 32 and parallel thereto are applied to the hitch guard member 2 at the downstream, lower inclined surface 32 thereof due to its engagement with the moving belt 9 traveling about the downstream hitch roller 13.

Generally, these forces alone will not generate sufficient force to cause the leg portions 26 and 27 to pull off from the mounting bar 3, and specifically for the lower inclined surface portions 48 of 49 of the inner surfaces 33 and 34 to be cammed up and outwardly off the lower guide surfaces 57 and 58 of the mounting bar 3. However, if the level of these forces is sufficiently high such as due to an impact by a conveyed article with the stuck debris or directly with the raised upstream edge 20 of the hitch guard member 2, the upward vertical component of the forces may be sufficient to cause the lower ends 35 and 36 of the lower tapered surface portions 48 and 49 to clear the upper ends 55 and 56 of the corresponding lower guide surface portions 57 and 58 of the bar 3 so that the hitch guard member 2 is no longer securely mounted thereto via the snap fit connection 5 therebetween. However, since the remaining hitch guard members 2 remain securely snap fit mounted to the bar 3, the gap 11 in the belt conveying surface 10 still can be traversed by conveyed products. In addition, an operator can quickly replace individual dislodged or damaged hitch guard members 2 rather than having to replace the entire hitch guard system 1.

The mounting bar 3 is positioned in the gap 11 in the belt conveying surface 10 between the two adjacent hitch rollers 12 and 13 so that the mounting bar member 3 is generally below the hitch guard members 2, as illustrated in FIGS. 1 and 2. More specifically, the bar 3 is mounted to extend below the tangent between the adjacent hitch rollers 12 and 13 so that the upper surface 23 of the hitch guard member 2 mounted to the bar 3 generally will be parallel and slightly below the tangent between the hitch rollers 12 and 13 so that forces that would tend to dislodge the hitch guard member 2 from the mounting member 3 are focused proximate to the location at which these forces are applied to the hitch guard members 2 in the area immediately below the upper surfaces 23 thereof. In this manner, large forces applied by or via stuck debris or other conveyed products that may otherwise cause belt damage will instead result in detachment of the impacted hitch guard member 2 from its snap fit connection 5 with the mounting bar 3 therebelow regardless of its lateral location along the gap 11.

The mounting bar 3 extends transversely or laterally across the width of the belt 9 with respect to belt travel direction 200 where it is mounted at each end to longitudinally extending support plate members or stringers along each side of the belt. The mounting member 3 is preferably formed from a metal or like material providing increased strength and durability. The mounting member 3 is preferably welded to the stringers, but may be fastened to the stringers using bolts 202 or other fasteners. If bolts 202 are utilized to fasten the mounting member 3 to the conveyor belt system stringers, threaded cavities 59 are preferably formed at each end of the mounting bar 3 to accept the bolts 202.

Alternatively, in one form, hanger devices in the form of mounting plates are provided for supporting the mounting member 3 to extend across the gap in the conveying surface. If the hitch guard system 1 is being utilized with the alternate hitch setup of FIG. 8, described in further detail below, elongate mounting plates 400, illustrated in FIGS. 4A and 4B may be positioned on each lateral side of conveyor belt 9, adjacent to the gap 65 to support the mounting bar 3 within the gap 65. To this end, each mounting plate 400, has an opening 402 extending therethrough at one end of the mounting plate 400. The opening 402 is sized to receive the mounting member 3 in slide-fit reception while restricting longitudinal or vertical movement of the mounting member 3 with regard to the belt travel direction. In this regard, mirror image mounting plates 400 are attached to the support plate members or stringers of the conveyor frame structure on both sides of the gap 65 in the conveyor belt 9 with the openings 402 adjacent to the gap 65 and configured so that the mounting member 3 extends across the conveyor belt gap, in its desired orientation, between the opposing mounting plates 400 with its ends being adjustably received in the openings 402. In this regard, the mounting plates 400 allow for variations in the lateral distance across the conveyor frame mounting structure, such as the stringer frame member. It will be appreciated, however, that when the hitch guard system 1 is assembled and supported by mounting plates as illustrated in FIG. 4A, the hitch guard members 2 will restrict excessive lateral movement of the mounting member 3.

The mounting plates are secured to the conveyor frame stringers by fasteners such as bolts 408 extending through bore holes 404 and corresponding bore holes in the stringers, as shown in FIG. 4A. With the mounting plate 400 attached to the stringer, the elongate portion of the mounting plate 400 extends along the stringer, generally following the travel path of the inclined section 67 of the conveyor belt 9. So configured, the mounting plate 400 avoids interference with the operation of the rollers 62 and 64 while providing a sufficient size for attachment to the stringers. The mounting plate also has a relatively small profile to avoid protruding into the path of conveyance, thereby avoiding interference with conveyed articles. The laterally outermost hitch guard members 2 may also include cutouts 414 for mating with the mounting plate 400 so that an extension portion 416 of the hitch guard member 2 extends laterally beyond the mounting plate 400. The mounting plate 400 may be formed of UHMW polyethylene or other suitable material.

Figure 4D:
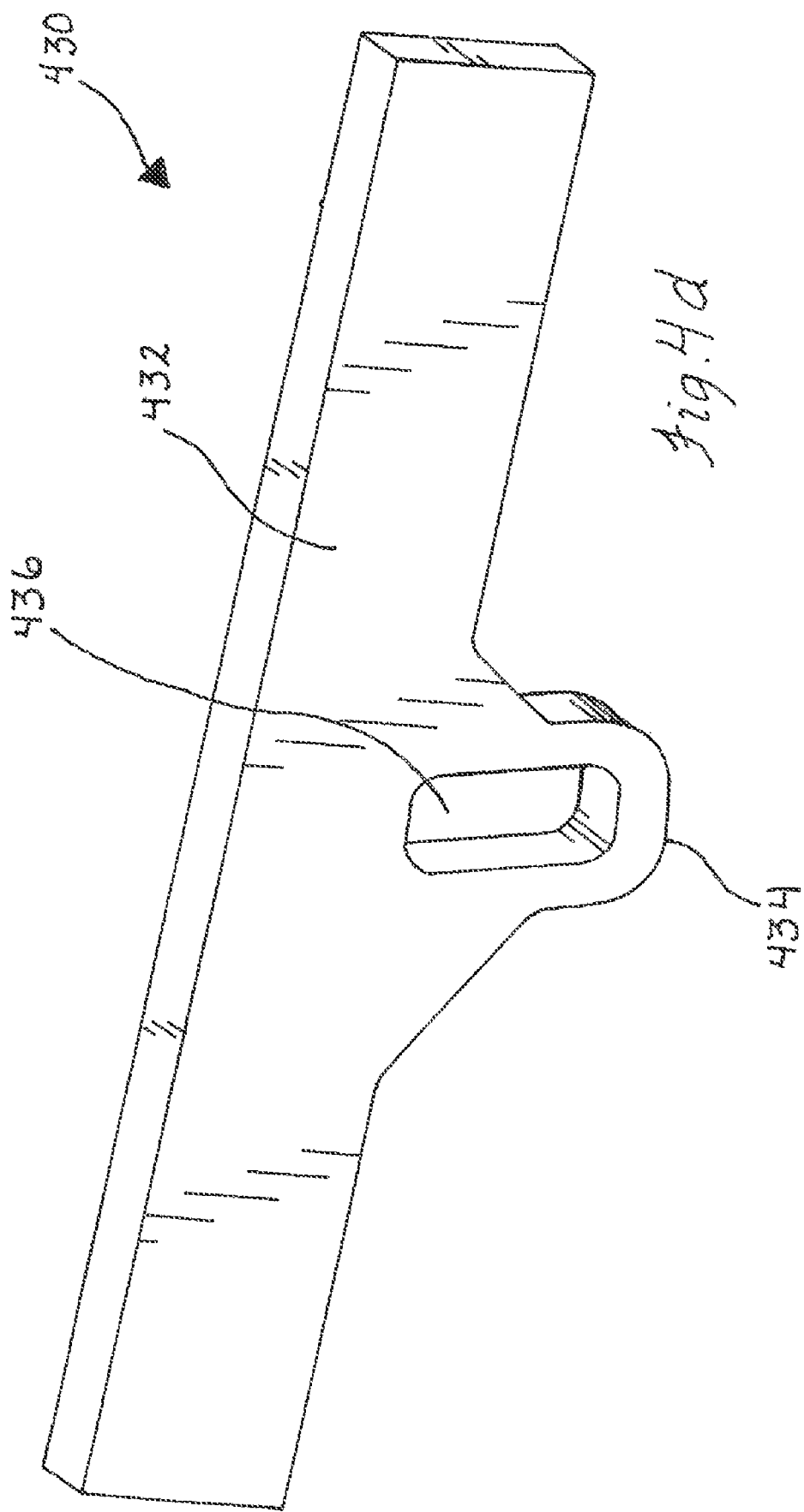
FIG. 4D is a perspective view of the elongate mounting plate of FIG. 4C showing an opening for receiving a mounting member.
Figure 7:
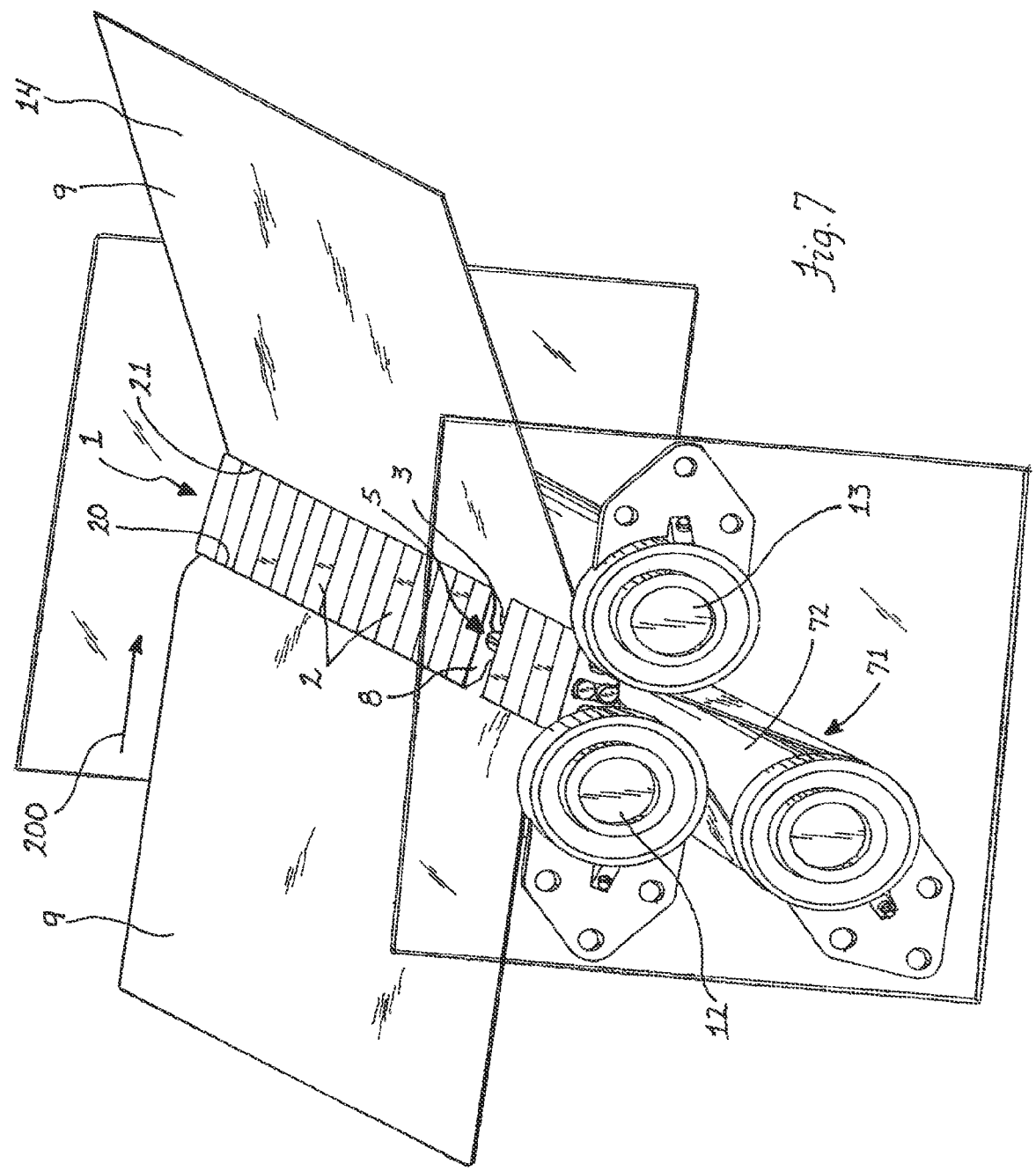
FIG. 7 is a perspective view of the hitch guard system of FIGS. 1 and 2 showing the setup of the hitch rollers.

If the hitch guard is being utilized in the hitch setup illustrated in FIG. 7, the mounting plate 430 of FIGS. 4C and 4D may be utilized. In this form, the mounting plate 430 includes a generally elongate upper portion 432 and a lower portion 434 extending downwardly from a midsection of the upper portion 432. The elongate upper portion 432 is attached to the stringers by bolts extending through bore holes (not shown), as described above with regard to mounting plate 400, to extend above the adjacent rollers 12 and 13 and outwardly adjacent from the lateral edges of the conveyor belt 9. The lower portion 434 extends downwardly generally between the adjacent rollers 12 and 13 and defines an opening 436 extending therethrough, similar to the opening 402 described above, for receiving the mounting member 3 therein. In this regard, mirror image mounting plates 430 can be attached at each lateral side of the conveyor belt 9 adjacent to the gap 11 formed in the conveying surface 10 and the mounting member 3 extends across the conveyor belt gap 11 between the opposing mounting plates 400 with its ends being received in the openings 436.

Figure 4E:
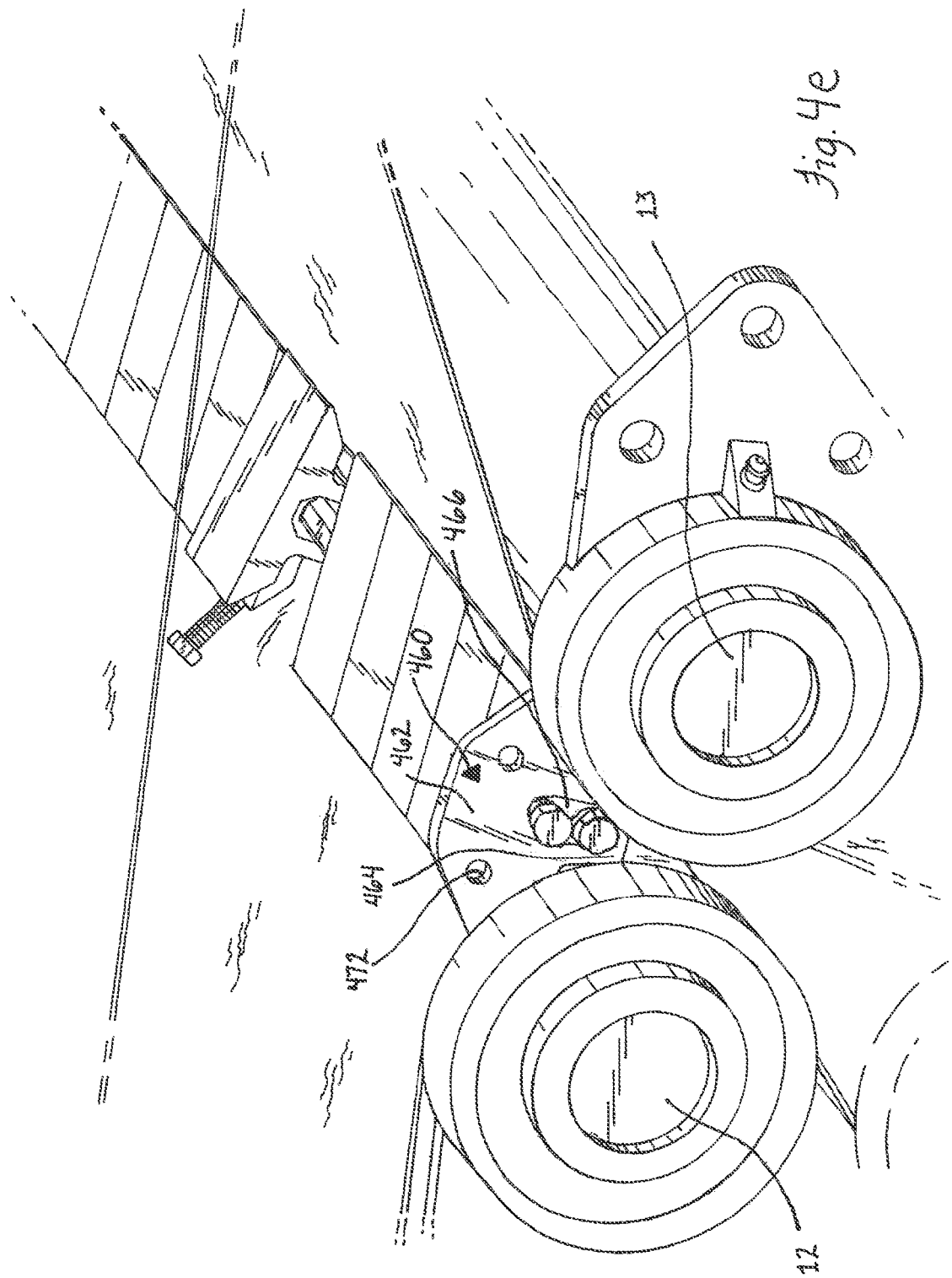
FIG. 4E is a perspective view of a hitch guard system showing a generally hexagonal mounting plate for supporting a mounting member in a conveyor belt hitch setup.

In yet another form, if the hitch guard is utilized in the hitch setup of FIG. 7, the mounting plate 460 of FIGS. 4E and 4F may be utilized. In this form, the mounting plate 460 has a generally hexagonal body 462 with a lower portion 464 that extends downwardly from the body 462, similar to the configuration of FIGS. 4C and 4D. The body 462 and lower portion 464 define an opening 466 that extends therethrough and is configured for receiving the mounting member 3 therein as described with regard to mounting plate 400 above. The mounting plate is attached to the stringers in an orientation in which the lower portion 464 extends downwardly generally between the adjacent hitch rollers 12 and 13. The body includes lower angled surfaces 468 that extend from the outer corners 470 of the body 462 to the lower portion 464 to avoid interfering with the rollers 12 and 13. As with the previous mounting plates 400 and 430, the upper portion may include a pair of bore holes 472 that correspond to bore holes of the stringers to accept bolts for attachment of the mounting plates 460 to the stringers in the manner described above.

The hitch guard members 2 can be provided so that different hitch guard members have different longitudinal distances between their receiving edge 20 and their discharge edge 21. This allows an appropriately sized hitch member guard 2 to be selected so that the receiving edges 20 and discharge edges 21 of all of the hitch guard members 2 generally have the same tolerance or spacing from the belt 10 as it travels about the adjacent hitch rollers 12 and 13 despite variations in the width of the gap 11 in the longitudinal belt travel direction 200. Such a width variation in the gap 11 can occur if the adjacent hitch rollers 12 and 13 are crowned, for example. In this instance, the gap 11 would progressively get narrower from one side of the belt 10 toward the lateral center thereof and would progressively increase in width from the lateral center to the other side of the belt 10. Another way to address this problem is to provide mounting bar 3 with a bow so that its curvature as it extends laterally from one side of the belt 10 to the other substantially matches the crown of the hitch rollers 12 and 13. The bow of the bar 3 in this instance would be such that the lateral ends of the bar are lower than the center thereof. With an arcuate bowed mounting bar 3 with a curvature generally tracking the crown of the hitch rollers 12 and 13, each of the hitch guard members 2 can be of substantially identical construction, particularly with respect to the distance between the opposite edges 20 and 21 thereof, while still maintaining a close proximity between their edges 20 and 21 and the surfaces of the belt 9 as it travels about the crowned hitch rollers 12 and 13.

The hitch guard system 1 of the present invention is illustrated as being located between the two adjacent hitch rollers 12 and 13 that extend along either side of the long gap 11 in the belt conveying surface 10, although the system 1 could be used in other applications, as has previously been mentioned. The illustrated application is in a three-roller hitch configuration 71 with FIGS. 1 and 2 showing the adjacent hitch rollers 12 and 13, and FIG. 7 showing all three rollers including adjacent rollers 12, 13 on either side of the gap 11 and lower hitch tensioning roller 72 generally disposed vertically below the upstream hitch roller 12 and slightly upstream therefrom. As can be seen in FIG. 7, the hitch guard members 2 substantially cover the gap 11 so that debris does not fall therein, potentially damaging the hitch roller 72.

FIG. 8 illustrates the hitch guard system 1 of the present invention located in a gap 65 between two adjacent hitch rollers 62 and 64 in an alternate hitch setup 61. The direction 200 of belt travel in FIG. 8 is from right to left. The generally horizontally traveling upstream belt section 66 travels over the upper hitch roller 62 down and back upstream toward a hitch tensioning roller 63. The belt 9 travels over and about the hitch roller 63 back up and downstream over the downstream hitch roller 64, generally adjacent to and downstream from the upstream hitch roller 62, where the belt's travel direction continues in the downstream conveying direction 200 of travel but with an inclined path of travel relative to the horizontal. As illustrated in FIG. 8, the hitch rollers 62 and 64 straddle the belt gap 65 with the downstream hitch roller 64 lower than the upstream roller 62 so that there is a vertical drop-off between the upstream horizontal belt section 66 and the downstream inclined belt section 67, as shown in FIG. 8. Accordingly, the mounting bar 3 and the hitch guard members 2 secured thereto are positioned so that their respective vertical axes 52 and 30 extend at a downstream incline to the horizontal with the upstream edges 20 of the hitch guard members 2 in close proximity with the belt 9 as it travels over the upstream hitch roller 62 and the downstream edges 21 of the hitch guard members 2 in close proximity to the belt 9 as it passes over the downstream hitch roller 64 to provide a smooth transfer surface for conveyed products traveling from the upstream, horizontal belt section 66 to the downstream, inclined belt section 67.

Figure 8B:
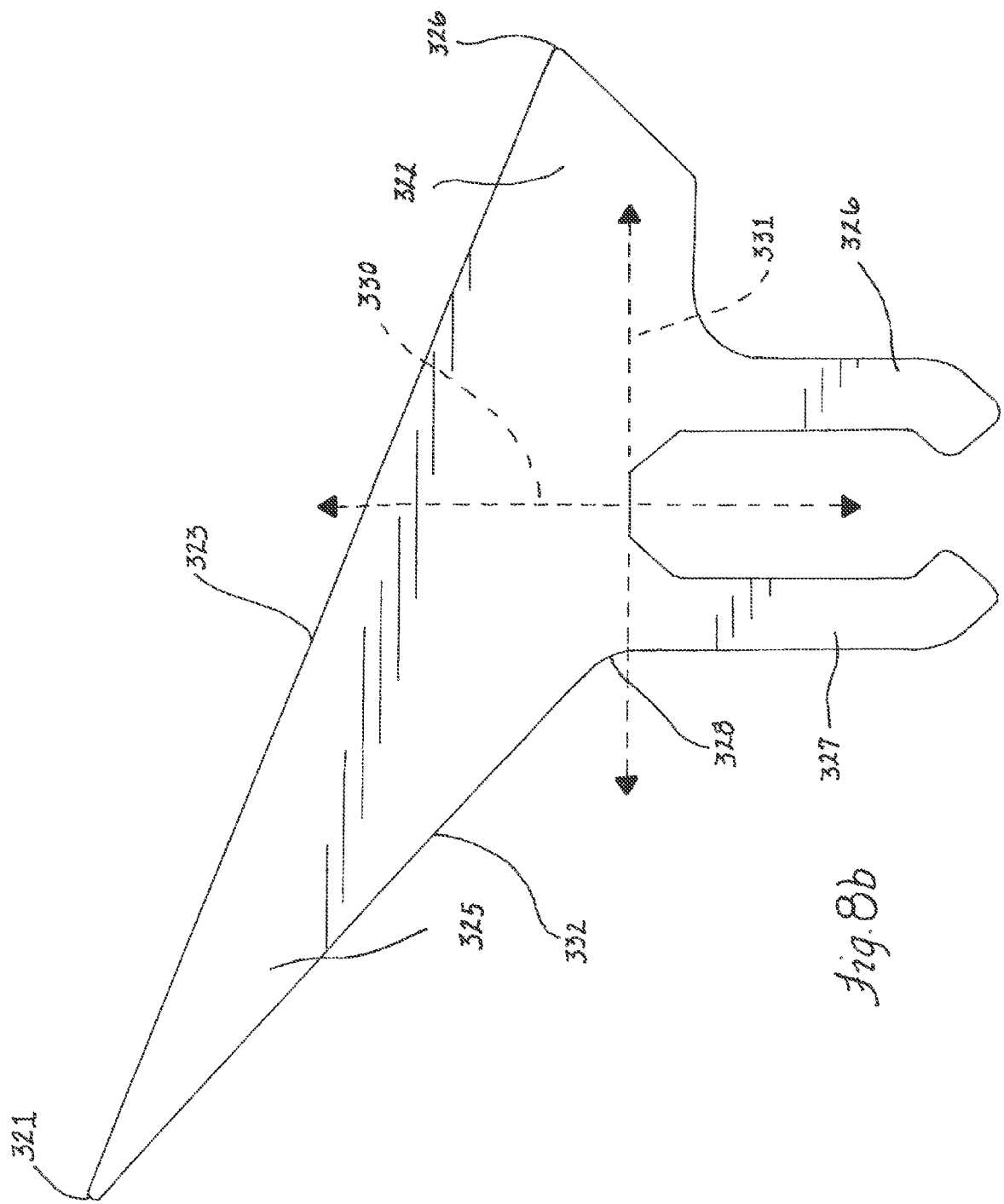
FIG. 8B is a side elevation view of the hitch guard member of FIG. 8A showing an upper bridge portion including an upper surface thereof that is elongated on the downstream side and which extends obliquely to the depending leg portions.

FIGS. 8A-8C illustrate an alternative configuration for a hitch guard member 302, tailored for use with the conveyor belt hitch setup of FIG. 8. The alternative hitch guard member 302 is similar to the hitch guard member 2 described above, but has an elongated downstream outboard portion 325 that extends obliquely to the downstream leg portion 327. Specifically, the downstream outboard portion 325 extends further than the upstream outboard portion 322 so that a downstream discharge edge 321 is located a further distance longitudinally from the vertical axis 330 than the upstream edge 320. Moreover, the upper transfer surface 323 is inclined as it extends from the upstream edge 320 to the downstream discharge edge 321 so that the downstream discharge edge 321 is vertically offset above the upstream edge 320 with regard to the horizontal axis 331 of the hitch guard member 302. An elongated downstream lower inclined surface 332 extends at an obtuse angle relative to the vertical axis 330 from a downstream upper leg juncture 328 to the downstream discharge edge 321.

FIG. 8C illustrates the alternative hitch guard member 302 of the present invention positioned on the mounting bar 3 in the gap 65 between two adjacent hitch rollers 62 and 64 in the alternate hitch setup 61 of FIG. 8. The alternate hitch guard member 302 is situated within the gap 65 in the same manner as described above with regard to the hitch guard member 2. In the alternate hitch setup 61, articles typically fall vertically downward and longitudinally downstream as they travel downstream from the upstream belt section 66 to the inclined belt section 67. Thus, when normal hitch guard members 2, as described above, are used in the alternate hitch setup 61, falling articles may impact the belt 9 rather than the hitch guard members 2, potentially causing damage to the belt 9 and the articles, because the downstream outboard portion 325 may not extend longitudinally downstream by a sufficient distance to provide an impact surface for the falling articles.

However, unlike with a normal hitch guard member 2, when an alternate hitch guard member 302 is used in the alternate hitch setup 61, the elongated downstream outboard portion 325 extends further longitudinally downstream along the inclined belt portion 67 providing an impact surface for falling articles. Moreover, as described above, the vertical axes 52 and 330 of the mounting bar 3 and alternative hitch guard segment 302 extend at a downstream incline to the horizontal in the alternate hitch setup. Thus, because the upper transfer surface 323 of the alternative hitch guard member 302 is oriented obliquely to the vertical axis 330 of the alternative hitch guard member 302, the upper transfer surface 323 of the alternative hitch guard member may be higher and will be more horizontally situated when mounted on the inclined mounting bar 3 than the upper transfer surface 23 of a normal hitch guard member 2. So configured, the alternative hitch guard member 302 provides a more horizontally situated surface 323 for articles to traverse as they are transferred from the upstream belt section 66 to the inclined belt section 67, allowing for a smoother transition of articles across the transfer surface 323. In addition, the transfer surface 323 will generally be higher than the transfer surface 23, depending on the relative sizing of the respective bodies of the hitch guard members such as the leg portions thereof so that the vertical distance that articles fall from the upstream belt section 66 to the inclined belt section 67 is reduced, decreasing the impact force between the falling articles and the alternative hitch guard segments 302.

Figure 10:
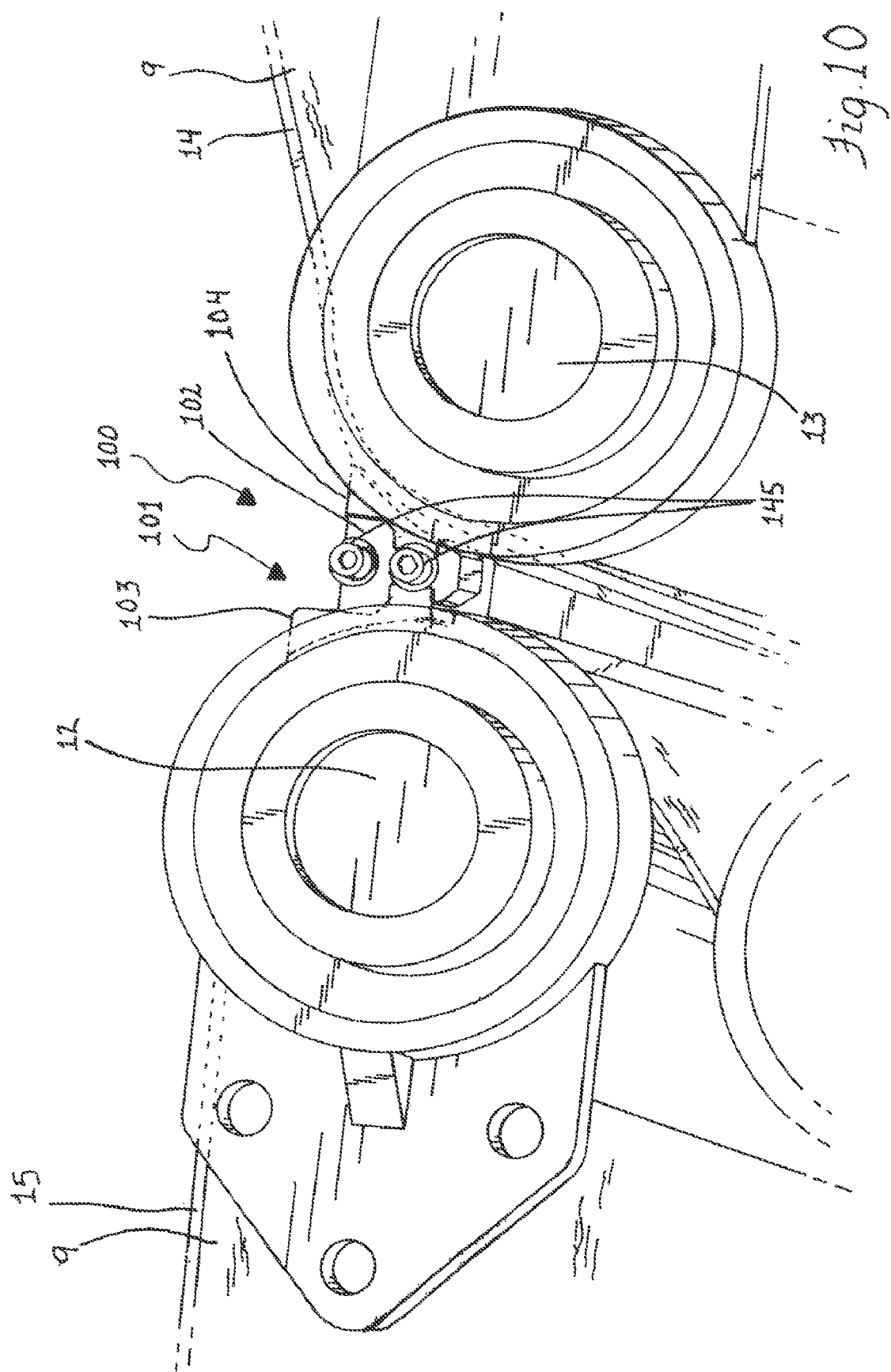
FIG. 10 is perspective view of the hitch guard system of FIG. 9 showing a mounting member that adjustably mounts the elongate hitch guard member at one of the lateral ends thereof.
Figure 12:
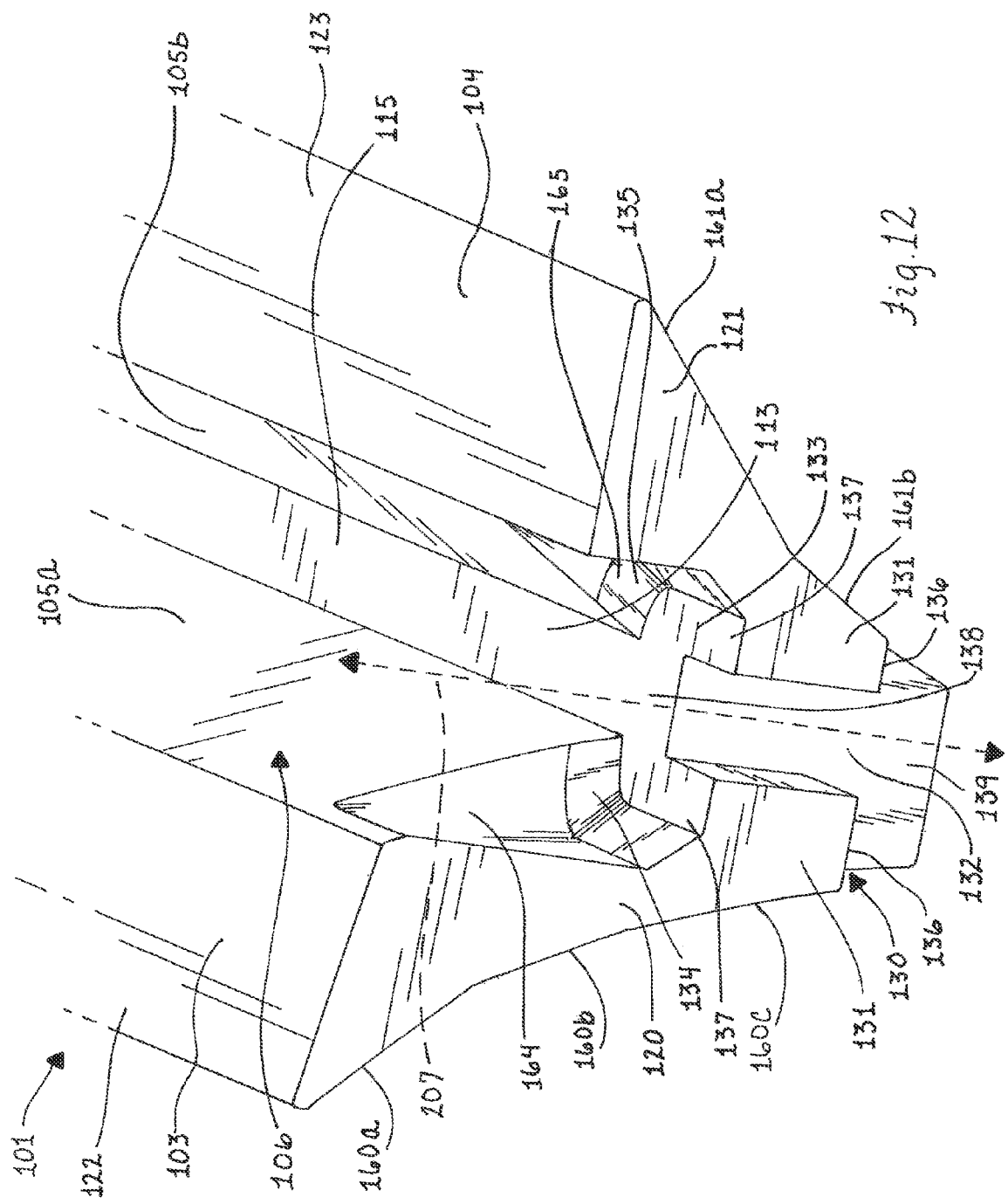
FIG. 12 is a perspective view of one end of the hitch guard member of FIGS. 9 and 10 showing an end seating portion thereof including a pair of terminal protrusions and a slot therebetween.

FIGS. 9 and 10 illustrate another hitch guard system 100 that includes a single hitch guard member 101 having a body 101a that is elongated so as to extend laterally across the width of the belt 9 and which fits into the conveyor belt gap 11 between the two adjacent hitch rollers 12 and 13. As shown in FIG. 12, the hitch guard body 101a has a generally V-shaped cross-sectional configuration with a pair of inclined side wall portions 120 and 121 that extend oppositely to each other and generally obliquely to vertical axis 107 of the body 101a. The V-shaped hitch guard body 101a fits in the belt gap 11 so that a flat upper transfer surface 103 of the upstream side wall portion 120 has its upstream, receiving edge 122 positioned closely adjacent to the conveyor belt 9 traveling over the upstream hitch roller 12. Similarly, a flat upper transfer surface 104 of the downstream side wall portion 121 has its downstream, discharge edge 123 positioned closely adjacent to the conveyor belt 9 traveling over the downstream hitch roller 13.

The V-shaped hitch guard body 101a has a recess 106 that extends laterally along the length of the body 101a. The recess 106 is preferably in the form of a narrow channel 115 that extends between the downstream and upstream side wall portions 121 and 122 of the body 101a, and specifically between the respective upper transfer surfaces 103 and 104 thereof, as best seen in FIGS. 9 and 12. The width of the laterally extending channel 115 is oriented in the longitudinal belt travel direction 200 and is narrowly sized so that items that are intended to be conveyed downstream pass easily over the transfer surfaces 103 and 104 spaced from each other or either side of the narrow channel 105. In this regard, the hitch guard member 101 is effective to reduce the width of the laterally extending gap 11 in the belt conveying surface 10 so that conveyed items can readily pass over the gap 11 with the hitch guard member 101 mounted therein. At the same time, small debris, such as nuts and bolts that may come loose from certain conveyed products, will fall into the channel 115 and be trapped therein for later removal therefrom rather than continuing to be conveyed downstream. To this end, the channel 115 is also of a sufficient depth so that the small debris can fall therein without projecting above the adjacent upper surfaces 103 and 104. This is also true for debris on the inclined downstream belt section 14 that may fall back therealong toward the belt gap 11 and hitch guard member 101 secured therein.

The single piece hitch guard member 101 will be primarily advantageous for hitch configurations like hitch setup 71 where the axis 107 of the hitch guard member 101 is oriented to extend substantially vertically. In this manner, the channel 115 opens upwardly and debris can readily fall and be collected therein for later removal therefrom.

By way of example and not limitation, the spacing across the narrow channel 115 between the downstream edge 116 of the upstream transfer surface 103 and the upstream edge 117 of the downstream transfer surface 104 can be approximately 1.06 inches. Additionally, the depth of the channel 115 from the upstream transfer surface 103 to a bottom recessed surface 113 of the channel 115 can be approximately 0.95 inches, and the depth from the downstream transfer surface 104 to the bottom recessed surface 113 can be approximately 0.51 inches.

As referenced above, it is preferred that the transfer surfaces 103 and 104 be vertically offset from one another along the vertical axis 107 of the hitch guard body 101a. In the preferred and illustrated form, the upstream transfer surface 103 is vertically elevated relative to the downstream transfer surface 104, as can be seen in FIG. 10. FIG. 9 shows that the higher, upstream flat transfer surface 103 is adjacent the horizontally orientated, upstream belt section 15, and the lower, downstream flat transfer surface 104 is adjacent the upwardly inclined, downstream belt section 14. In this manner, the channel 115 is less likely to cause a hang-up of products being conveyed downstream on the belt 9 as they pass over the hitch guard member 101 since the products will be pushed off the higher upstream surface 103 by the adjacent moving belt 9 and land on the lower downstream surface 104 due to its forward or downstream momentum, rather than falling against the channel inner side surface 105b and the upstream edge 117 of the downstream transfer surface 104 such as may be more likely if the transfer surfaces 103 and 104 were configured to be at the same vertical level.

Figure 11:
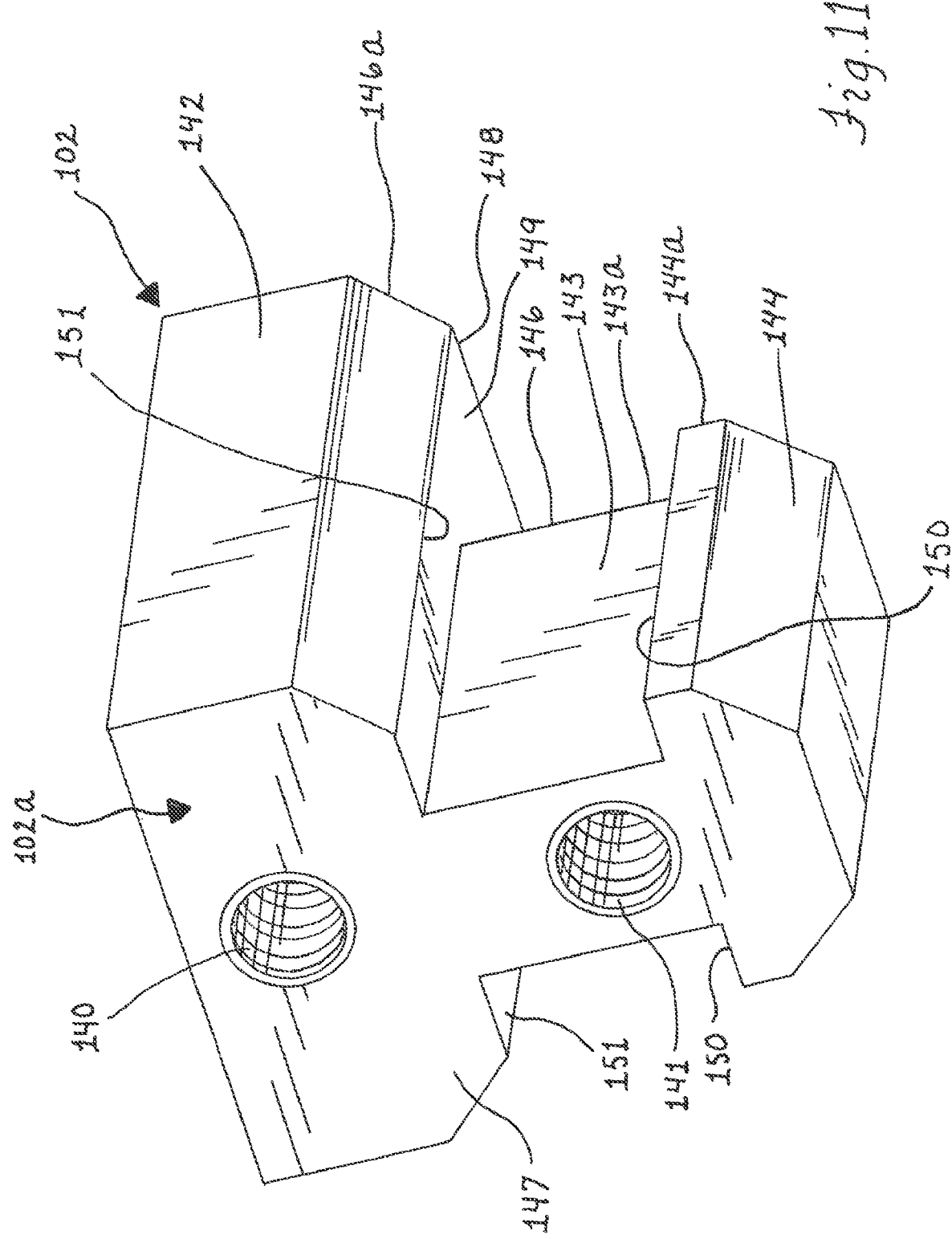
FIG. 11 is a perspective view of the mounting member of FIG. 10 having an I shaped configuration including an enlarged upper portion, a narrow, central portion, and an enlarged lower portion.

For securing the hitch guard member 101 in the belt gap 11, mounting blocks 102 are utilized at either end thereof, one of which is shown in FIG. 11. The mounting blocks 102 are of identical configuration and each have a generally I-shaped body 102a with an enlarged upper portion 142, a narrow portion 143 depending centrally from the upper portion 142, and a lower enlarged portion 144. The enlarged portions 142 and 144 extend transversely to the narrow portion 143. The block body 102a has an upper threaded bore 140 centrally disposed in the upper enlarged portion 142 and a lower threaded bore 141 disposed in the narrow portion 143 adjacent the lower enlarged portion 144. The mounting blocks 102 are secured to the conveyor frame stringers by fasteners such as bolts 145 threaded into bores 140 and 141, as shown in FIG. 10.

With the mounting blocks 102 mounting the hitch guard member 101 in the belt gap 11 as shown, the hitch guard member 101 is captured between the pair of mounting blocks 102 at either end of the hitch guard member body 101a. Preferably, the mounting blocks 102 adjustably capture the body 101a therebetween to allow for variations in the lateral distance across the conveyor frame mounting structure, such as the stringer frame members of the conveyor belt system. For this purpose, the hitch guard member body 101a has end seating portions 130 that cooperate to adjustably secure the mounting blocks 102 in engagement therewith.

Referencing FIG. 12, one of the end seating portions 130 is illustrated. The end seating portion 130 includes a pair of protruding, generally block-shaped mounting portions 131 associated with the side wall portions 120 and 121 of the hitch guard body 101a at the lower end portions thereof. The block shaped portions are spaced to form a slot 132 therebetween, sized to receive the narrow portion 143 of the mounting blocks 102 therein, as seen in FIG. 10. As shown in FIG. 11, the mounting blocks 102 have the upper portion 142 sized to extend beyond the rear side 146 of the narrow depending portion 143 while the front side surface 147 of the I-shaped body 102a is flush across each body portion 142-144. Accordingly, the mounting block body 102a has a rear, overhang portion 148 so that the upper portion 142 has a generally U-shaped bottom surface 149 that extends laterally along the rear, overhang portion 148 and fore-and-aft along either side of the narrow portion 143.

The seating portion 130 also has a generally U-shaped seating surface 133 formed on the top of each of the block-shaped mounting portions 131 and including end portion 138 of the bottom recessed surface 113 of the channel 115, as shown in FIG. 12. For mounting the hitch guard member 101 to the mounting block 102, the mounting block lower surface 149 is supported on and can slide along the hitch guard seating surface 133 until the rear side flush surfaces 143a and 144a of the respective mounting block portions 143 and 144 engage against lower abutment surface 139 at the end of the slot 132 and below the block portions 131 so that the abutment surface 139 has an inverted T-shaped configuration. In this position, the rear side 146a of the mounting block upper portion 142 on the overhang portion 148 thereof is spaced from upstanding surfaces 134 and 135 of the hitch guard body 101a that extend upwardly from the rear of the seating surface 133. The end seating portion 130 includes facing pocket cut-outs 164 and 165 of the hitch guard member side wall portions 120 and 121 with portions of the U-shaped seating surface 133 being disposed on the bottom surface of the pocket cut-outs 164 and 165, and the upstanding surfaces 134 and 135 are at the rear of the pocket cut-outs 164 and 165 adjacent the end of the channel 115.

With the rear surfaces 143a and 144a of the mounting block narrow and lower portions 143 and 144 engaged against the abutment surface 139, the mounting block narrow portion 143 is received in the slot 132 and the mounting block lower portion 144 extends under the lower block mounting portions 131 on either side of slot 132 so that the bottom surfaces 136 of the block mounting portions 131 are supported on the top side surfaces 150 of the lower enlarged portion 144 extending beyond and fore-and-aft along either side of the mounting block narrow center portion 143, as shown in FIG. 10.

The mounting blocks 102 and end seating portions 130 of the hitch guard member 101 are configured as described above to provide for adjustability therebetween to allow the hitch guard member 101 to be secured to side frame members or stringers on either side of the conveyor belt 9 of a conveyor belt system that may vary in the lateral spacing therebetween. For this purpose, the rear side surfaces 143a and 144a of the block portions 143 and 144 can be spaced from the abutment surface 139 with the lower block mounting portions 131 remaining captured between the enlarged upper and lower portions 142 and 144 of the mounting block 102, and specifically the respective bottom and top surfaces 149 and 150 thereof. In fact, the block portions 143 and 144 can be drawn away from the abutment surface 139 so that the overhang portion lower surface 149 does not engage the end portion 138 of the channel bottom surface 113 since side portions 151 of the U-shaped lower surface 149 will still be supported on side portions 137 of the U-shaped seating surface 133 on top of the block mounting portions 130.

Because the hitch guard member 101 is slideably mounted on mounting blocks 102, if enough debris becomes trapped between the belt 109 and the receiving edge 122 of the upper surface 112, the hitch guard member 101 can begin to bow upwardly in its center, away from the ends of the hitch guard in the general direction of the normal force exerted by the trapped debris on the hitch guard member 101. The bowing of the center of hitch guard 101 will cause the effective straight line length of the hitch guard to decrease. Upon sufficient force exerted by lodged debris or conveyed products on the receiving edge 122 of the hitch guard member 101, the center of the hitch guard member may bow upwardly a sufficient amount and decrease the overall effective straight line length of the hitch guard member 101 enough to slide at least one of the end seating portions 130 away from its slideably coupled state with mounting block 102 to dislodge the hitch guard member 101 from the mounting block 102 and relieve the force from the debris on the belt 9 and the hitch guard member 101 to avoid abrasion to the belt 9.

Turning to more of the details, the side wall portions 121 and 122 can each have an outer belt facing surface 160 and 161 that is contoured to generally follow the path of the adjacent belt 9 as it travels about the hitch rollers 12 and 13. As shown in FIG. 12 the upstream belt facing surface 160 consists of a series of flat surface portions 160a, 160b, 160c, and the downstream belt facing surface 161 consists of a pair of flat surface portions 161a and 161b. Manifestly, these belt facing surfaces 160 and 161 could have other constructions, such as an arcuate configuration, to more closely follow the path of the belt 9 about the hitch rollers 12 and 13.

The side wall portions 121 and 122 also have inner, generally facing, inclined side surfaces 105a and 105b that extend laterally along either side of the channel 115. As shown in FIG. 12, the inclination of upstream side surface 105a is greater than that of the downstream side surface 105b so that the angle between the upstream side surface 105a and the vertical axis 107 of the hitch guard member 101 is less than the angle between the downstream side surface 105b and the vertical axis 107.

The hitch guard 101 can be formed of UMW polyethylene or other like material that offers increased abrasion resistance and a surface having a low coefficient of friction. The mounting blocks 102 can be formed from a metal or like material to offer increased strength and durability.

FIGS. 13 and 14 illustrate an automatic gap take-up mechanism 201 that can be used with the segmented hitch guard system 1 of FIG. 1. The illustrated automatic gap take-up mechanism 201 includes a spring cartridge 203 that is operable to automatically reposition the remaining hitch guard members 2 along the mounting bar 3 to fill a gap in the hitch guard conveying surface formed after a hitch guard member 2 is dislodged from the mounting bar 3 as described above. The spring cartridge 203 has a pair of spring housings in the form of cylinders 202 and 204 in which a biased actuator member in the form of a plunger 206 is housed. Behind the plunger 206 in each of the cylinders 202 and 204 is an internal compression spring 212 biasing the plunger 206 so that a plunger inner end 208 is biased into engagement with the outside wall 214 of the hitch guard member 2 located laterally outermost along the mounting bar 3 adjacent to the spring cartridge 203. So configured, the plunger 206 urges the outermost hitch guard member 2 laterally away from the spring cartridge 203, which in turn urges the remaining hitch guard members 2 originally located on the side of the gap formed in the place of the missing hitch guard member 2 toward the gap so that the hitch guard member 2 originally positioned adjacent to the gap is repositioned to take-up the space formerly occupied by the missing hitch guard member 2.

The spring cartridge 203 is positioned alongside the lateral edge of the long gap 11 formed therein between two adjacent rollers 12 and 13 as described above. The spring cartridge cylinders 202 and 204 each have a bore 216 extending longitudinally therethrough. When the spring cartridge 203 is mounted alongside the belt 9, one of the cylinders is the upstream cylinder 202 and the other cylinder is the downstream cylinder 204. The upstream cylinder 202 extends laterally outwardly with regard to the longitudinal belt travel direction from an upstream side of an upper portion 220 of a generally T-shaped mounting plate 218. The upstream cylinder 202 is mounted to or integral with the outer surface 224 of the upstream side of the mounting plate upper portion 220. An outlet opening 226, which is smaller than the bore 216 in cross-section is formed in the mounting plate upper portion 220 and at the laterally inner end of the bore 216 of the upstream cylinder 202. The plunger 206 has its cross-section configured similar to that of the outlet opening 226 to extend therethrough and to keep the plunger from rotating in the cylindrical bore 216.

In the illustrated form, the plunger 206, is generally in the form of a bar or rod having a semi-circular cross-section sized to fit through a semi-circular outlet opening 226 in the mounting plate upper portion 220 so that the plunger can extend and slide therethrough. The plunger 206 is positioned through the opening 226 so that a laterally outer end 210 thereof is located within the cylinder bore 216 and the laterally inner end 208 thereof extends beyond the opening 226 and the mounting plate inner surface 230 to engage the hitch guard member outer wall 214 of the outermost hitch guard member 2. In this manner, the plunger 206 is longitudinally slideable in the bore 216 and through the outlet opening 226 thereof. The plunger outer end 210 has a slideable disc 232 attached thereto. The disc 232 is engaged with the laterally innermost coil of the spring 212. The slideable disc 232 is sized to fit and slide longitudinally within the cylinder bore 216. In this configuration, the slideable disc 232 will move with the plunger 206 as the plunger 206 slides longitudinally within the cylinder bore 216. When the slideable disc is slid laterally inwardly toward the adjacent hitch guard member 2 by a sufficient amount, it will engage the portion 220 of the mounting plate 218 above the outlet opening 226 restricting any further inward movement of the slideable disc 232 or the plunger 206, to retain the slideable disc 232 within the hollow opening 216.

Spring loading of the plunger 206 is accomplished using the helical compression spring 212 located within the cylinder bore 216 on the side of the slideable disc 232 opposite the plunger 206, with the end coil 236 of the spring 212 engaging the slideable disc 232. An end disc 240 is located at the laterally outer end 242 of the cylinder bore 216 for engaging the outer end coil 237 of the coil spring 212, to restrict longitudinal movement of the stationary end 237 of the spring 212. A retaining ring 228 is inserted into the laterally outer end 242 of the cylinder bore 216 and secured therein. The retaining ring 228 includes flanges 248 extending radially inwardly toward the center axis 246 of the cylinder bore 216 to provide an abutment surface for the end disc 240. So configured, the retaining ring 228 maintains the position of the end disc and restricts the end disc 240 from moving laterally outwardly, out of the cylinder bore 216.

The spring 212 is preferably of sufficient length relative to the length of the cylinder 202 such that when the slideable disc 232 is in the innermost position, abutting against the mounting plate outer surface 224, the spring outer end coil 237 engages the end disc 240 and the inner end coil 236 engages the slideable disc outer surface 238 with the spring remaining in compression. So configured, the spring 212 exerts a spring force against the slideable disc 232 through its entire range of motion, continually urging the slideable disc 232 inwardly, and thus the plunger inner end 208 against the hitch guard member outer wall 214. In this approach, the spring 212 preferably provides a sufficient spring force, through its entire range of motion, in combination with the spring 212 of the downstream cylinder 204, to overcome the frictional forces generated between the hitch guard members 2 and the mounting bar 3 formed at the detachable connections 5 located therebetween, which forces oppose the hitch guard members 2 from sliding therealong.

The downstream cylinder 204 extends laterally outwardly away from the downstream side of the upper portion 220 of the mounting plate 218 and is configured substantially similar to the upstream cylinder 202 described above. Similarly, a plunger 206 of the downstream cylinder 204, extends through an opening 226 formed at the downstream side of the mounting plate upper portion 220. The mounting plate 218 is attached to side support members or stringers extending longitudinally along the side of the conveyor belt 9. If attachment is accomplished using bolts, the mounting plate 218 lower portion 252 includes a pair of bore holes extending therethrough for receiving the bolts. The mounting plate bore holes may cooperate with bore holes 59 in the mounting bar 3 and the side support members as described above such that with the mounting bar bore holes 59 and the mounting plate bore holes aligned with corresponding holes in the side support member, a single pair of bolts may be used for attaching the mounting bar 3 to the inside of the side support member and the mounting plate 218 to the outside of the side support member.

The mounting plate 218 is positioned and attached to the side support member such that the plunger 206 inner ends 208 engage the outer wall 214 of the hitch guard member 2 located laterally outermost along the mounting bar 3 adjacent to the spring cartridge 203. Preferably, the upstream and downstream cylinders 202 and 204 are slightly longitudinally offset from the hitch guard member 2 vertical axis 30 with regard to the direction of belt travel and symmetrical about the hitch guard vertical axis 30 so that the plunger inner ends 208 of the upstream and downstream cylinders 202 and 204 contact the hitch guard member outer wall 214 at approximately equal distances from the hitch guard member 2 vertical axis 30. In this manner, any moment of force caused from one of the spring loaded plungers 206 being reacted against the hitch guard member 2 is substantially offset by an approximately equal and opposite moment of force exerted by the other spring loaded plunger 206.

In a normal operating state, when no hitch guard member 2 has been dislodged and all of the hitch guard members 2 of the hitch guard system 1 abut end-to-end, the plungers 206 of cylinders 202 and 204 are slid into the corresponding cylinder bore 216 with a loaded amount 254 of the plunger 206 located therein and the remaining portion of the plunger extending through the opening 226 and beyond the mounting plate inner surface 230 to engage the adjacent hitch guard member 2. The inward spring force caused by the springs 212 are reacted on the plunger 206 through the slideable disc 232 and urge the plunger inner end 208 to tightly abut the outer wall 214 of the adjacent hitch guard member 2. This force is reacted through each adjacent hitch guard member 2 located on the mounting bar 3 through their end-to-end abutment with one another, and thus urges the hitch guard members 2 away from the spring cartridge.

In one approach a spring cartridge 203 is only provided on one lateral side of the hitch guard system 1. In this approach, the loaded amount 254 of the plunger 206 is preferably greater than or at least equal to the width of one hitch guard member 2 before any of the hitch guard members 2 are detached from the mounting bar 3. In this manner, even after a hitch guard member 2 becomes dislodged from the mounting bar 3, the plunger continues to provide a spring force on the remaining hitch guard segments 2, even after they are shifted to take-up the missing hitch guard member 2, to keep them tightly abutted and provide a continuous transfer surface. In this approach, a stop (not shown) is provided at the opposite side of the mounting bar 3 to prevent the opposite outermost hitch guard member 2 from moving beyond the stop to restrict the hitch guard members 2 from shifting other than to take-up a dislodged hitch guard member 2.

In this approach, if a hitch guard member 2 becomes dislodged, forming a gap the width of a single hitch guard member 2 along the mounting bar 3, the spring 212 will urge the plunger 206 inwardly by a distance of a hitch guard member, moving the remaining hitch guard members 2 located on the side of the gap formed from the dislodged hitch guard member 2 closest to the spring cartridge 203 by a distance of one hitch guard member 2 in order to replace the dislodged hitch guard member 2. Thus, the hitch guard member 2 that was previously positioned adjacent to the missing hitch guard member 2 takes-up the gap formed by the dislodged hitch guard member 2 and provides a continuous transfer surface.

In another approach, a spring cartridge 203 is positioned on each lateral side of the hitch guard system 1, with the inner ends 208 of the plungers 206 thereof engaging the hitch guard member outer walls 214 of the hitch guard members 2 positioned laterally outermost along the mounting bar 3 on both sides thereof adjacent to the spring cartridges 203. In this approach, each of the plungers 206 is spring loaded with a loaded amount 254 of the equal to or greater than approximately half the width of a single hitch guard member 2 located within the cylinder hollow opening 216. In a normal state, when a hitch guard member has not been dislodged, the opposing spring forces acting inwardly on the outer walls 214 of the outermost hitch guard members 2 on each side of the hitch guard system 1, will counteract each other and prevent the plungers 206 from shifting the hitch guard members 2. However, when a single hitch guard member 2 is ejected from its detachable connection with the mounting bar 3, the spring loaded plungers 206 on each side will slide inwardly through the openings 226 urging the remaining hitch guard members 2 on each side of the gap formed from the missing hitch guard member to slide toward each other along the mounting bar 3 by a portion of the width of a hitch guard member. Thus, the hitch guard members 2 originally positioned on either side of the missing hitch guard member will be repositioned to abut one another to take-up the gap formed from the dislodged hitch guard member 2, with each filling a portion of the gap, providing a continuous transfer surface across the hitch guard system 1.

Optionally, in either approach discussed above, one or more additional replacement hitch guard members 2 can be positioned laterally beyond the edges of the conveyor belt 9 on the mounting bar 3, such that when a hitch guard member is dislodged from the mounting bar 3 and the remaining hitch guard members 2 are repositioned to take-up the gap, an open space is not formed laterally near the outside of the conveyor belt 9 due to the shifting of the outermost hitch guard member 2 away from its laterally outermost position. In this approach, a longer mounting bar 3 may be provided to extend beyond the outer edges of the conveyor belt 9 to provide a detachable connection 5 for the additional hitch guard members 2. In this manner, the additional hitch guard member 2 originally positioned laterally beyond the edges of the conveyor belt 9 is repositioned further inward by the plunger 206 to avoid the formation of a space at the lateral outermost position of the hitch guard system 1 along the outside of the conveyor belt 9.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. A hitch guard system comprising:
a plurality of hitch guard members each having a substantially flat, upper surface for generally spanning a gap formed in a conveyor belt traveling over adjacent conveyor belt rollers and in a longitudinal travel direction such that each hitch guard member has upstream and downstream edges that, at the upper surface, extend linearly in a lateral direction across the conveyor belt;
a lower mounting bar for extending laterally across the belt between the adjacent conveyor belt rollers in the conveyor belt gap; and
a lower detachable connection between each of the hitch guard members and the lower mounting bar with the detachable connection being located below the upper surface of each of the corresponding hitch guard members and being configured to fix the upper surfaces of the hitch guard members against shifting in the longitudinal direction and to allow side edges extending between the upstream and downstream edges of adjacent hitch guard members to abut one another to avoid accumulation of debris under the hitch guard members.

2. The hitch guard system of claim 1, wherein the lower detachable connections are configured to resiliently deform and release the hitch guard members from the mounting bar when receiving a sufficient force from an object that impacts against the hitch guard members.

3. The hitch guard system of claim 1, wherein the hitch guard members each include upstream and downstream leg portions extending downwardly from the upper surface and spaced to receive the mounting bar tightly therebetween.

4. The hitch guard system of claim 3, wherein the mounting bar has a predetermined width thereacross, and each leg portion has a resilient configuration and includes a lower end having a lower interfering portion with the interfering portions being more narrowly spaced across from each other than the mounting bar width, and the interfering portions each having a cam surface configured so that pushing the hitch guard member onto the mounting bar causes the interfering portions to resiliently deflect to allow the leg portions to be snap fit onto the mounting bar.

5. The hitch guard system of claim 1, further comprising a mounting bracket positioned on either side of the conveyor belt gap, wherein the mounting bracket includes an opening configured to slidably receive the mounting bar therein for supporting the mounting bar in the gap.

6. The hitch guard system of claim 1, further comprising an actuator for urging the hitch guard members in a lateral direction.

7. A hitch guard member comprising:
a body of resilient material;
a bridge portion of the body having a substantially flat, upper surface for generally spanning a gap formed in a conveyor belt traveling over adjacent belt rollers;
an attachment portion of the body extending generally downward from the bridge portion; and
a cam surface of the attachment portion that is configured to cause the attachment portion to resiliently deflect when the attachment portion is shifted downwardly toward a lower mounting member for forming a snap fit attachment therewith.

8. The hitch guard member of claim 7, wherein the body includes oppositely extending outboard portions each having a lower surface that is inclined relative to the upper surface for generally following the path of a belt extending around a roller.

9. The hitch guard member of claim 7, wherein the attachment portion includes resilient upstream and downstream leg portions that extend generally downwardly and relatively parallel to each other, and each leg portion includes a lower interfering portion that are more closely spaced than the leg portions, and the lower interfering portions each have bottom cam surface that taper away from each other.

10. The hitch guard member of claim 7, wherein the body has a central, vertical axis and is generally symmetrical about the central, vertical axis and the bridge portion has equal length upstream and downstream outboard portions from the central, vertical axis so that the hitch guard member is reversible.

11. The hitch guard system of claim 8, wherein the hitch guard member has a central, vertical axis and wherein one of the outboard portions has a length that is greater than the length of the other outboard portion from the central, vertical axis, and the upper surface extends obliquely to the central, vertical axis.

12. A hitch guard system comprising:
a unitary hitch guard member having a bridge portion with an upper transfer surface for generally spanning the gap formed in a conveyor belt traveling across two adjacent rollers;
opposing resiliently flexible upstream and downstream leg portions of the unitary hitch guard member extending downwardly from the bridge portion; and
a lower mounting bar configured to have a substantially mating fit between the leg portions and so that the mounting bar does not extend upstream or downstream beyond the upstream and downstream leg portions when received therebetween.

13. The hitch guard system of claim 12, wherein the leg portions are configured to resiliently deform and release the hitch guard member from the mounting bar when receiving a sufficient force from an object that impacts against the hitch guard member.

14. The hitch guard system of claim 12, wherein the mounting bar has a predetermined width extending thereacross, the leg portions each include a lower interfering portion with the interfering portions being more narrowly spaced across from each other than the mounting bar width, and the interfering portions each have a cam surface configured so that pushing the hitch guard member onto the mounting bar causes the interfering portions to resiliently deflect to allow the leg portions to be snap fit onto the mounting bar.

15. The hitch guard system of claim 12, wherein the hitch guard member includes oppositely extending outboard portions each having a lower surface inclined relative to the upper transfer surface to generally follow the belt path extending around a roller.

16. The hitch guard system of claim 15, wherein the hitch guard member has a central, vertical axis and one of the outboard portions has a length that is greater than the length of the other outboard portion from the central, vertical axis, and the upper surface of the hitch guard member is oriented obliquely to the central, vertical axis to more closely horizontally align with a conveyor belt surface when the hitch guard member is positioned in the gap with its central, vertical axis at an incline to the belt surface.

17. The hitch guard system of claim 12, wherein the hitch guard member has a central, vertical axis and is generally symmetrical about the central, vertical axis and each hitch guard member includes an upper bridge portion with equal length upstream and downstream outboard portions from the central, vertical axis so that the hitch guard members are reversible within the gap.

18. The hitch guard system of claim 12, further comprising a mounting bracket positioned alongside the conveyor belt gap, wherein the mounting bracket includes an opening configured to slidably receive the mounting bar therein for supporting the mounting bar in the gap.

19. A hitch guard system comprising:
a hitch guard member that has an elongated configuration for extending laterally across a conveyor belt and fitting in a gap in the conveyor belt; and
a laterally elongated recess of the hitch guard member being completely open along at least a majority of the length thereof for capturing debris therein keeping debris from falling into the conveyor belt gap, wherein the hitch guard member includes a substantially flat, upstream upper transfer surface extending laterally across the width of the conveyor belt upstream of the recess, and a substantially flat, downstream upper transfer surface extending laterally across the conveyor belt and downstream of the recess, with the upper transfer surfaces being exposed and sized for transferring conveyed articles engaged therewith across the gap in the conveyor belt and the laterally elongated recess being sized to position the substantially flat, upper transfer surfaces adjacent the conveyor belt on either side of the gap.

20. The hitch guard system of claim 19, wherein the upstream upper surface is vertically elevated above the downstream upper surface so that conveyed articles pass over the hitch guard member and are not caught in the recess.

21. The hitch guard system of claim 19, further comprising;
a mounting block positioned at the lateral edge of the gap in the conveyor belt configured to slidably receive the hitch guard member for supporting the hitch guard member within the gap of the conveyor belt.

* * * * *